(12) United States Patent
Humfeld

(10) Patent No.: US 10,264,191 B2
(45) Date of Patent: Apr. 16, 2019

(54) CALIBRATION OF PIXELS FOR PRODUCING SUPER RESOLUTION IMAGES

(71) Applicant: THE BOEING COMPANY, Chicago, IL (US)

(72) Inventor: Keith D. Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/668,310

(22) Filed: Aug. 3, 2017

(65) Prior Publication Data

US 2019/0045106 A1 Feb. 7, 2019

(51) Int. Cl.
*H04N 5/235* (2006.01)
*H04N 5/232* (2006.01)
*H04N 5/265* (2006.01)

(52) U.S. Cl.
CPC ....... *H04N 5/2356* (2013.01); *H04N 5/23232* (2013.01); *H04N 5/265* (2013.01)

(58) Field of Classification Search
CPC .................................................. H04N 5/2356
USPC ....................................................... 348/222.1
See application file for complete search history.

(56) References Cited

U.S. PATENT DOCUMENTS

| | | | |
|---|---|---|---|
| 5,400,070 A | 3/1995 | Johnson et al. | |
| 5,514,865 A | 5/1996 | O'neil | |
| 5,789,622 A | 8/1998 | Quon et al. | |
| 6,184,527 B1 | 2/2001 | Young | |
| 6,208,765 B1 | 3/2001 | Bergen | |
| 6,734,903 B1 | 5/2004 | Takeda et al. | |
| 7,218,751 B2 | 5/2007 | Reed et al. | |
| 9,430,814 B2 | 8/2016 | Humfeld | |
| 2002/0126209 A1 | 9/2002 | Yamada et al. | |
| 2003/0160875 A1* | 8/2003 | Mitsunaga | G06T 3/4015 348/222.1 |
| 2006/0209201 A1 | 9/2006 | Spears et al. | |
| 2006/0215234 A1 | 9/2006 | Vertoprakhov | |
| 2008/0123802 A1 | 5/2008 | Hirshenbein et al. | |
| 2014/0022339 A1* | 1/2014 | Dane | H04N 13/0033 348/42 |
| 2016/0093021 A1* | 3/2016 | Humfeld | G06T 3/4053 348/345 |

OTHER PUBLICATIONS

Extended European Search Report, dated Dec. 21, 2018, EP Application No. 18186609.6-1209.

* cited by examiner

*Primary Examiner* — Joel W Fosselman
(74) *Attorney, Agent, or Firm* — Womble Bond Dickinson (US) LLP

(57) ABSTRACT

A method of producing super resolution images includes a detector array capturing images of a scene in which detector array provides pixels for respective portions of the scene, and the detector array captures the images in increments in each of which a lens or the detector array is moved a length of an individual detector. The method also includes a processing unit determining light intensities of the pixels, and calibrating the pixels to a reference pixel based on the light intensities and thereby compensate for any differences in sensitivity of the individual detectors. This calibration is based on a comparison of light intensities of the reference pixel and an other pixel in respectively one and an other of the images in which the portion of the scene is the same for the reference pixel in the one of the images and the other pixel in the other of the images.

30 Claims, 14 Drawing Sheets

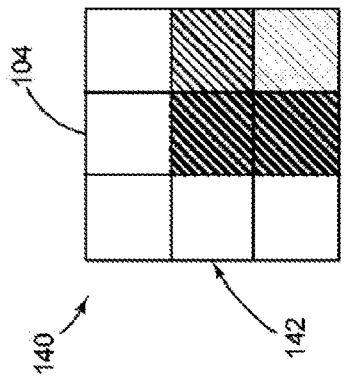
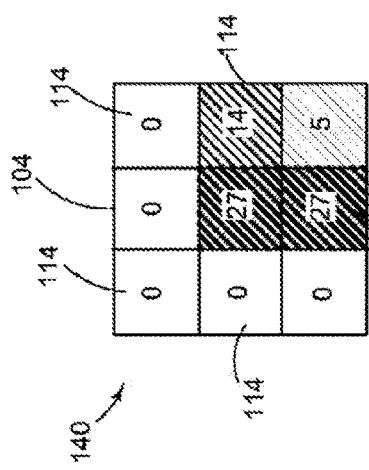
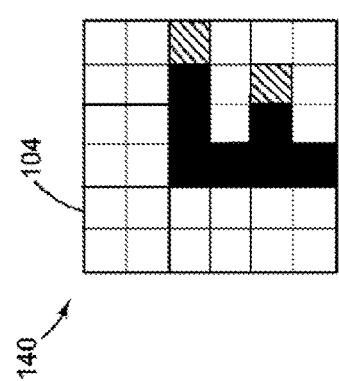
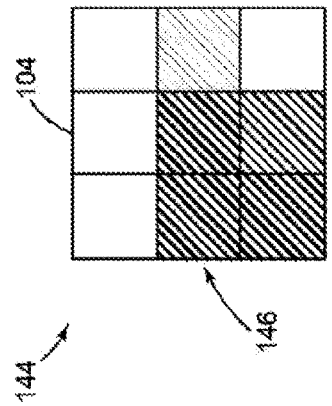
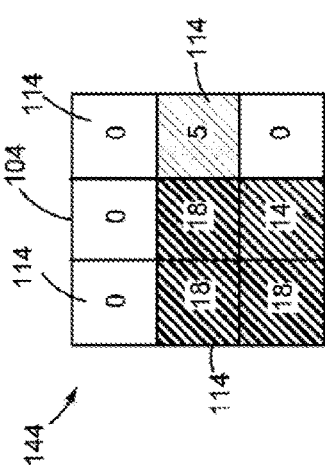
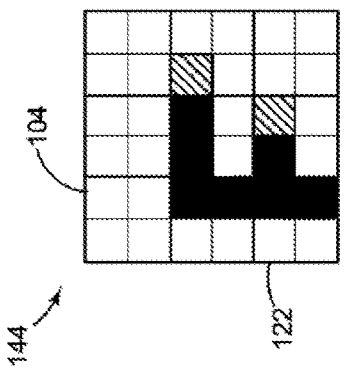

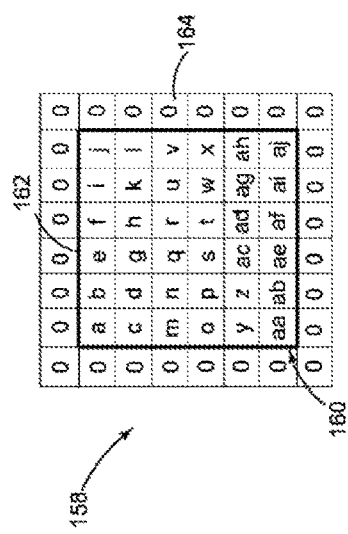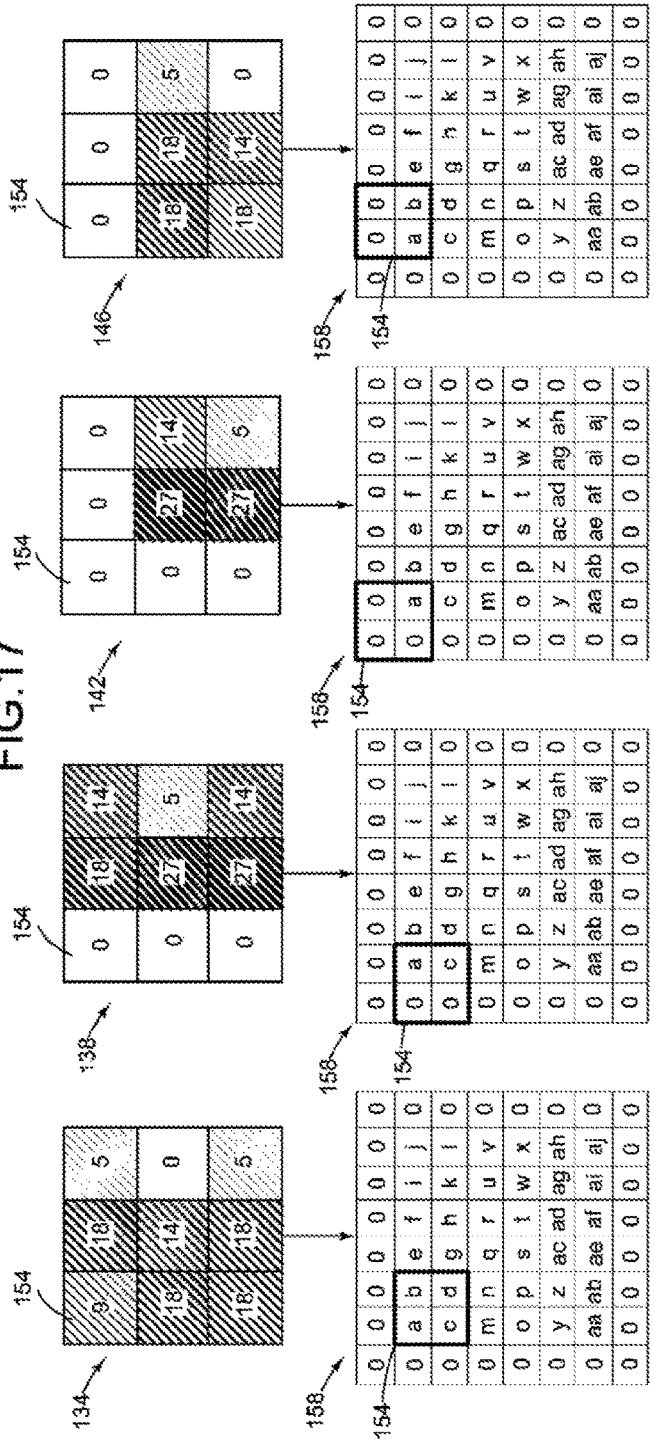
FIG. 17
FIG. 18

166

CALIBRATION OF PIXELS FOR PRODUCING SUPER RESOLUTION IMAGES

TECHNOLOGICAL FIELD

The present disclosure relates generally to imaging and, in particular, to move-based super resolution imaging.

BACKGROUND

Camera systems are an important component of satellites, unmanned aerial vehicles (UAVs), and other surveillance platforms used for the purpose of intelligence, surveillance, and reconnaissance (ISR). Recently, technology to enhance resolution in camera systems has been integrated into an increasing number of applications for use in both military and civilian environments. The resolution enhancement technology may take shape in a variety of forms across these applications. For example, some technology is implemented via computer software, while other resolution enhancements may result from the physical optics used.

However, resolution enhancement technology may be limited in digital camera systems. In particular, a digital camera may capture a digital image by detecting photons received by a charge coupled device (CCD) or other photodetector array over a period of time. The resolution of standard CCD camera data is sorely limited by size and count of individual pixels in the CCD camera.

A computational technique called super resolution may be used to increase the resolution of the CCD camera beyond its physical limits. With super resolution techniques, images of a higher resolution than the resolution of the originally captured image may be produced. More specifically, super resolution techniques compare numerous lower resolution images to one another and then statistically develop a higher resolution image from these lower resolution images.

BRIEF SUMMARY

An improved camera system for producing super resolution images according to a move-based super resolution processing technique is disclosed in U.S. Pat. No. 9,430,814, entitled: Move Based and Sonic Based Super Resolution, issued on Aug. 30, 2016, the content of which is incorporated herein by reference. The present disclosure is directed to enhancements that address a number of drawbacks including pixel-to-pixel sensitivity differences and moving objects in the scene being imaged, which may produce propagating aberrations in move-based super resolution image processing.

According to example implementations of the present disclosure, the pixels of a detector array are calibrated to a reference pixel to compensate for any differences in sensitivity of the individual detectors. In some examples, this calibration includes capturing images of a scene during which the focal plane of the detector array is moved one pixel/detector width in at least one direction for some subset of the images. Thus, in some of the images, a number of detectors measure light coming in from the same part of the scene as other detectors in other of the images. This, then, is used to compensate for any pixel-to-pixel (device-to-device) differences in sensitivity. If pixel sensitivity differences change only slowly, or if this is done in two-dimensions, the pixel sensitivity differences can be removed from the redundant images to determine motion within the scene. Detected motion within the scene can be interpolated to determine its impact on each of the images in the sequence, which will reduce motion blur.

The present disclosure thus includes, without limitation, the following example implementations.

Some example implementations provide a camera system for producing super resolution images, the camera system comprising a lens; a detector array configured to capture images of a scene focused through the lens onto a focal plane, the detector array comprising an array of individual detectors configured to provide pixels for respective portions of the scene, the detector array being configured to capture the images in increments in each of which the lens or the detector array and thereby the focal plane is moved a length of an individual detector along a horizontal direction or a vertical direction as defined by a physical arrangement of the detector array; and a processing unit configured to determine light intensities of the pixels in the images, and calibrate the pixels to a reference pixel of the pixels based on the light intensities and thereby compensate for any differences in sensitivity of the individual detectors, wherein for each pixel of at least some of the pixels, the processing unit being configured to calibrate the pixel includes being configured to at least: perform a comparison of a light intensity of the reference pixel of one of the images and a light intensity of the pixel in an other of the images in which the portion of the scene is the same for the reference pixel in the one of the images and the pixel in the other of the images; and based thereon, determine a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel.

In some example implementations of the camera system of the preceding or any subsequent example implementation, or any combination thereof, the detector array being configured to capture the images in increments includes being configured to capture the images in at least two increments, including at least one increment in which the focal plane is moved the length of the individual detector along the horizontal direction, and at least one increment in which the focal plane is moved the length of the individual detector along the vertical direction.

In some example implementations of the camera system of any preceding or any subsequent example implementation, or any combination thereof, for each other pixel of at least another some of the pixels, the processing unit being configured to calibrate the other pixel includes being configured to at least determine a ratio of a light intensity of the pixel in one of the images to a light intensity of the other pixel in an other of the images in which the portion of the scene is the same for the pixel in the one of the images and the other pixel in the other of the images; and determine a multiplier for adjustment of the light intensity of the other pixel, the multiplier being a product of the multiplier for adjustment of the light intensity of the pixel, and the ratio of the light intensity of the pixel to the light intensity of the other pixel.

In some example implementations of the camera system of any preceding or any subsequent example implementation, or any combination thereof, the processing unit being configured to perform the comparison includes being configured to perform comparisons of the light intensity of the reference pixel and the light intensity of the pixel in respective pairs of the images in which the portion of the scene is the same for the reference pixel and the pixel, and wherein the processing unit being configured to determine the multiplier includes being configured to determine an average of the ratio of the light intensity of the reference pixel to the light intensity of the pixel for the respective pairs of images.

In some example implementations of the camera system of any preceding or any subsequent example implementation, or any combination thereof, for any particular pixel of the pixels, the processing unit is configured to perform a comparison of the light intensity of the reference pixel in one of the images and a light intensity of the particular pixel in an other of the images in which the portion of the scene is the same for the reference pixel in the one of the images and the particular pixel in the other of the images; and identify the particular pixel as a faulty pixel in an instance in which the light intensity of the reference pixel and the light intensity of the particular pixel are different by more than a predetermined threshold that indicates a faulty pixel.

In some example implementations of the camera system of any preceding or any subsequent example implementation, or any combination thereof, the camera system further comprises a transducer coupled to the lens or the detector array, and configured to move the lens or the detector array and thereby the focal plane; and a control unit in communication with the transducer, and configured to control the transducer to move the lens or the detector array.

In some example implementations of the camera system of any preceding or any subsequent example implementation, or any combination thereof, the camera system is configured to produce a super resolution image after calibration of the pixels, and in which the transducer is configured to move the lens or the detector array and thereby the focal plane over a predetermined time period during which the detector array is configured to capture a plurality of images; the control unit is configured to divide the pixels into sub-pixels and control the transducer to move the lens or the detector array in increments of a length of a sub-pixel during the predetermined time period; and the processing unit is configured to determine light intensities of the pixels from the plurality of images and using the multiplier for each pixel of the at least some of the pixels, determine light intensities of the sub-pixels from the light intensities of the pixels, and combine the light intensities of the sub-pixels to produce a single image.

In some example implementations of the camera system of any preceding or any subsequent example implementation, or any combination thereof, the plurality of images includes a sequence of images with a first image, a last image and at least one image therebetween, and the processing unit is further configured to at least perform a comparison of light intensities of at least one pair of pixels in the first image and the last image in which the portion of the scene is the same for the at least one pair of pixels in the first image and the last image, and wherein in at least one instance in which the light intensities of the at least one pair of pixels are different by more than a predetermined threshold that indicates movement in the scene, the processing unit being configured to determine the light intensities of the pixels includes being configured to determine light intensities of the pixels in the at least one image between the first image and the last image by interpolation from the light intensities of the pixels in the first image and the last image.

In some example implementations of the camera system of any preceding or any subsequent example implementation, or any combination thereof, the length of the sub-pixel corresponds to a fraction of a pixel, and the processing unit being configured to determine the light intensities of the pixels in the at least one image includes being configured to at least interpolate light intensities for the respective portions of the scene in the at least one image based on light intensities of pixels for the respective portions of the scene in the first image and the last image; and determine the light intensities of the pixels in the at least one image based on fractions of the light intensities for the respective portions of the scene corresponding to fractions of the respective portions of the scene in the pixels in the at least one image.

Some example implementations provide a method of producing super resolution images, the method comprising capturing, by a detector array, images of a scene focused through a lens onto a focal plane, the detector array comprising an array of individual detectors providing pixels for respective portions of the scene, the detector array capturing the images in increments in each of which the lens or the detector array and thereby the focal plane is moved a length of an individual detector along a horizontal direction or a vertical direction as defined by a physical arrangement of the detector array; and determining, by a processing unit, light intensities of the pixels in the images, and calibrating the pixels to a reference pixel of the pixels based on the light intensities and thereby compensate for any differences in sensitivity of the individual detectors, wherein for each pixel of at least some of the pixels, calibrating the pixel including at least: performing a comparison of a light intensity of the reference pixel of one of the images and a light intensity of the pixel in an other of the images in which the portion of the scene is the same for the reference pixel in the one of the images and the pixel in the other of the images; and based thereon, determining a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel.

In some example implementations of the method of any preceding or any subsequent example implementation, or any combination thereof, capturing the images in increments includes capturing the images in at least two increments, including at least one increment in which the focal plane is moved the length of the individual detector along the horizontal direction, and at least one increment in which the focal plane is moved the length of the individual detector along the vertical direction.

In some example implementations of the method of any preceding or any subsequent example implementation, or any combination thereof, for each other pixel of at least another some of the pixels, calibrating the other pixel includes being at least determining a ratio of a light intensity of the pixel in one of the images to a light intensity of the other pixel in an other of the images in which the portion of the scene is the same for the pixel in the one of the images and the other pixel in the other of the images; and determining a multiplier for adjustment of the light intensity of the other pixel, the multiplier being a product of the multiplier for adjustment of the light intensity of the pixel, and the ratio of the light intensity of the pixel to the light intensity of the other pixel.

In some example implementations of the method of any preceding or any subsequent example implementation, or any combination thereof, performing the comparison includes performing comparisons of the light intensity of the reference pixel and the light intensity of the pixel in respective pairs of the images in which the portion of the scene is the same for the reference pixel and the pixel, and wherein determining the multiplier includes determining an average of the ratio of the light intensity of the reference pixel to the light intensity of the pixel for the respective pairs of images.

In some example implementations of the method of any preceding or any subsequent example implementation, or any combination thereof, for any particular pixel of the pixels, the method includes performing a comparison of the light intensity of the reference pixel in one of the images and a light intensity of the particular pixel in an other of the images in which the portion of the scene is the same for the reference pixel in the one of the images and the particular pixel in the other of the images; and identifying the particular pixel as a faulty pixel in an instance in which the light intensity of the reference pixel and the light intensity of the particular pixel are different by more than a predetermined threshold that indicates a faulty pixel.

In some example implementations of the method of any preceding or any subsequent example implementation, or any combination thereof, the method further comprises moving, by a transducer coupled to the lens or the detector array, the lens or the detector array and thereby the focal plane; and controlling, by a control unit in communication with the transducer, the transducer to move the lens or the detector array.

In some example implementations of the method of any preceding or any subsequent example implementation, or any combination thereof, the method further comprises producing a super resolution image after calibration of the pixels, and including moving, by the transducer, the lens or the detector array and thereby the focal plane over a predetermined time period during which the detector array captures a plurality of images; dividing, by the control unit, the pixels into sub-pixels and controlling the transducer to move the lens or the detector array in increments of a length of a sub-pixel during the predetermined time period; and determining, by the processing unit, light intensities of the pixels from the plurality of images and using the multiplier for each pixel of the at least some of the pixels, determining light intensities of the sub-pixels from the light intensities of the pixels, and combining the light intensities of the sub-pixels to produce a single image.

In some example implementations of the method of any preceding or any subsequent example implementation, or any combination thereof, the plurality of images includes a sequence of images with a first image, a last image and at least one image therebetween, and the method further includes at least performing a comparison of light intensities of at least one pair of pixels in the first image and the last image in which the portion of the scene is the same for the at least one pair of pixels in the first image and the last image, and wherein in at least one instance in which the light intensities of the at least one pair of pixels are different by more than a predetermined threshold that indicates movement in the scene, determining the light intensities of the pixels includes determining light intensities of the pixels in the at least one image between the first image and the last image by interpolation from the light intensities of the pixels in the first image and the last image.

In some example implementations of the method of any preceding or any subsequent example implementation, or any combination thereof, the length of the sub-pixel corresponds to a fraction of a pixel, and determining the light intensities of the pixels in the at least one image includes at least interpolating light intensities for the respective portions of the scene in the at least one image based on light intensities of pixels for the respective portions of the scene in the first image and the last image; and determining the light intensities of the pixels in the at least one image based on fractions of the light intensities for the respective portions of the scene corresponding to fractions of the respective portions of the scene in the pixels in the at least one image.

Some example implementations provide a computer-readable storage medium for producing super resolution images, the computer-readable storage medium being non-transitory and having computer-readable program code portions stored therein that in response to execution by a processing unit, cause an apparatus to at least determine light intensities of pixels in images of a scene from by a detector array configured to capture the images focused through a lens onto a focal plane, the detector array comprising an array of individual detectors configured to provide the pixels for respective portions of the scene, the detector array being configured to capture the images in increments in each of which the lens or the detector array and thereby the focal plane is moved a length of an individual detector along a horizontal direction or a vertical direction as defined by a physical arrangement of the detector array; and calibrate the pixels to a reference pixel of the pixels based on the light intensities and thereby compensate for any differences in sensitivity of the individual detectors, wherein for each pixel of at least some of the pixels, the apparatus being caused to calibrate the pixel includes being caused to at least: perform a comparison of a light intensity of the reference pixel of one of the images and a light intensity of the pixel in an other of the images in which the portion of the scene is the same for the reference pixel in the one of the images and the pixel in the other of the images; and based thereon, determine a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel.

In some example implementations of the computer-readable storage medium of any preceding or any subsequent example implementation, or any combination thereof, for each other pixel of at least another some of the pixels, the apparatus being caused to calibrate the other pixel includes being caused to at least determine a ratio of a light intensity of the pixel in one of the images to a light intensity of the other pixel in an other of the images in which the portion of the scene is the same for the pixel in the one of the images and the other pixel in the other of the images; and determine a multiplier for adjustment of the light intensity of the other pixel, the multiplier being a product of the multiplier for adjustment of the light intensity of the pixel, and the ratio of the light intensity of the pixel to the light intensity of the other pixel.

In some example implementations of the computer-readable storage medium of any preceding or any subsequent example implementation, or any combination thereof, the apparatus being caused to perform the comparison includes being caused to perform comparisons of the light intensity of the reference pixel and the light intensity of the pixel in respective pairs of the images in which the portion of the scene is the same for the reference pixel and the pixel, and wherein the apparatus being caused to determine the multiplier includes being caused to determine an average of the ratio of the light intensity of the reference pixel to the light intensity of the pixel for the respective pairs of images.

In some example implementations of the computer-readable storage medium of any preceding or any subsequent example implementation, or any combination thereof, for any particular pixel of the pixels, the apparatus is caused to perform a comparison of the light intensity of the reference pixel in one of the images and a light intensity of the particular pixel in an other of the images in which the portion of the scene is the same for the reference pixel in the one of the images and the particular pixel in the other of the images; and identify the particular pixel as a faulty pixel in an instance in which the light intensity of the reference pixel and the light intensity of the particular pixel are different by more than a predetermined threshold that indicates a faulty pixel.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 10 is a diagrammatic view of the detector array shifted to a third position from the second position of FIG. 7;

FIGS. 11 and 12 are diagrammatic views of respectively light intensities detected by individual detectors of the detector array, and a third image captured by the detector array, in the third position of FIG. 10;

FIG. 13 is a diagrammatic view of the detector array shifted to a fourth position from the third position of FIG. 10;

FIGS. 14 and 15 are diagrammatic views of respectively light intensities detected by individual detectors of the detector array, and a fourth image captured by the detector array, in the fourth position of FIG. 13;

FIG. 17 is a diagrammatic view of a reference array for processing via linear algebra, in accordance with another example implementation;

FIG. 18 is a diagrammatic view of applying the reference array of FIG. 17 to the images of FIGS. 6, 9, 12, and 15, in accordance with another example implementation;

Figure 21:
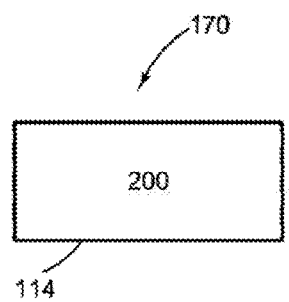
Figure 22:
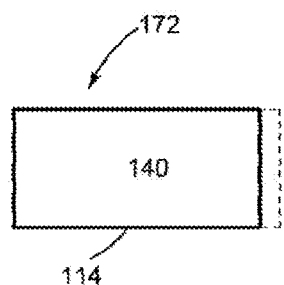
Figure 23:
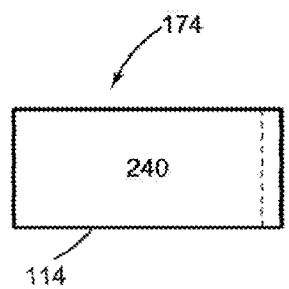
Figure 24:
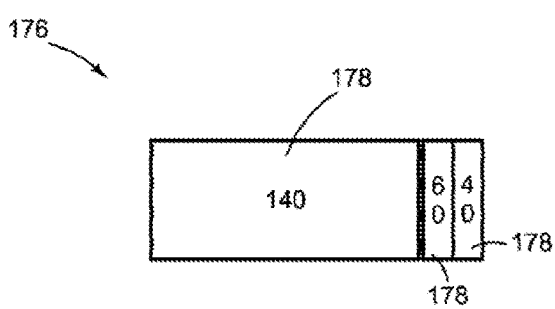
Figure 25:
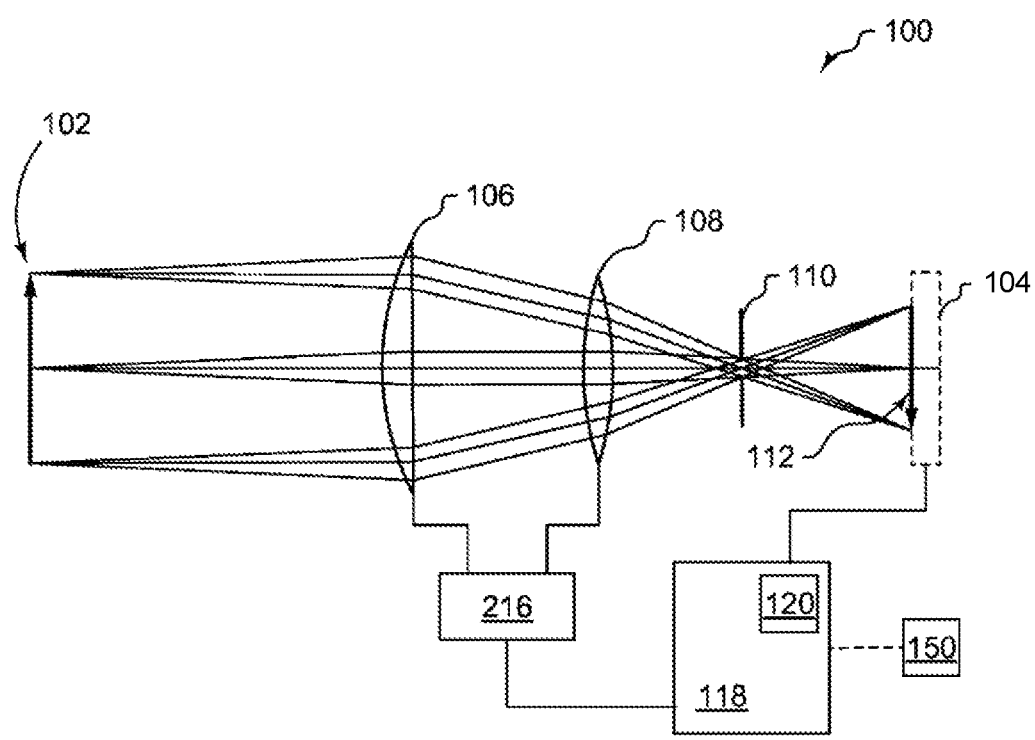
Figure 26:
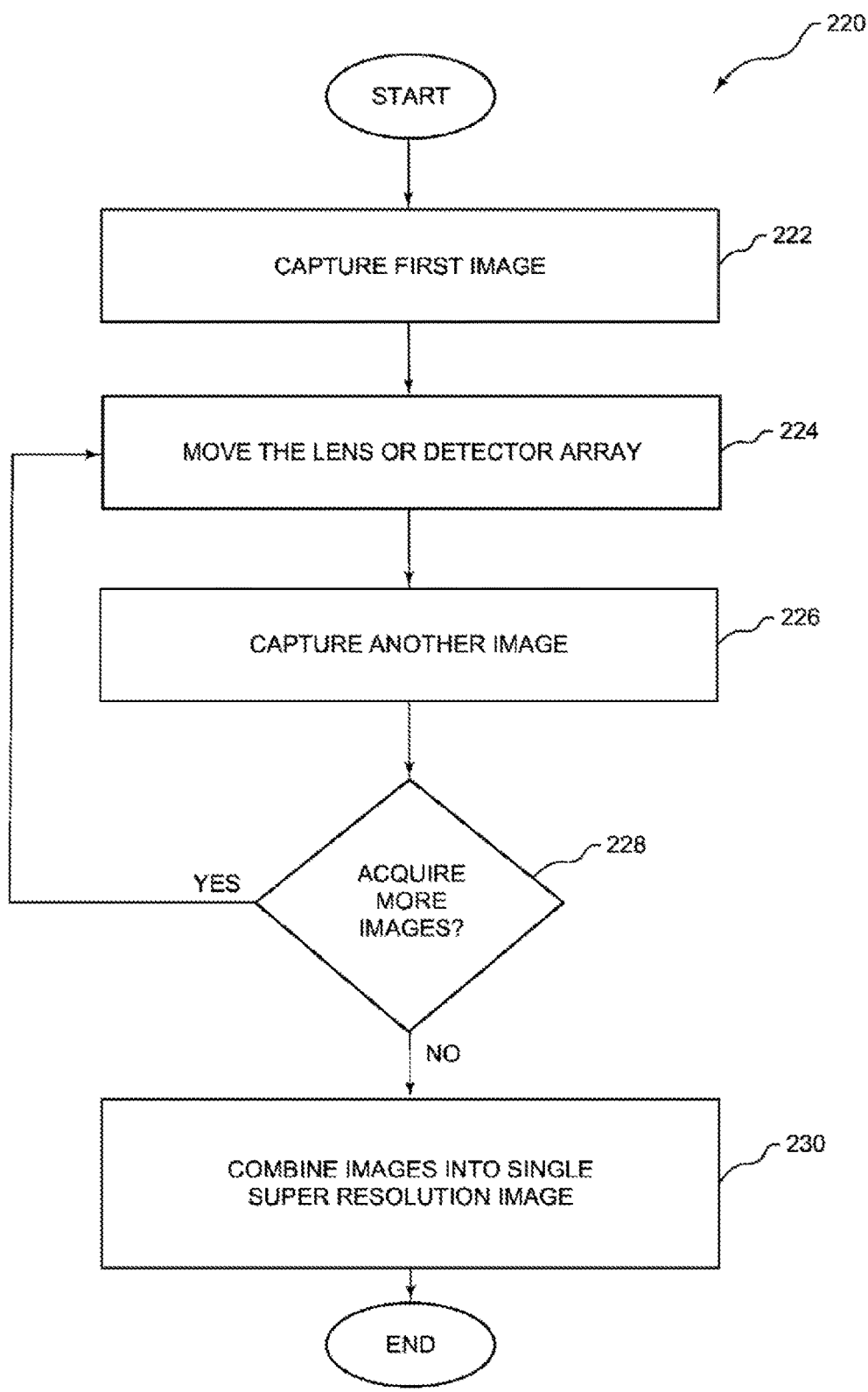
Figure 27:
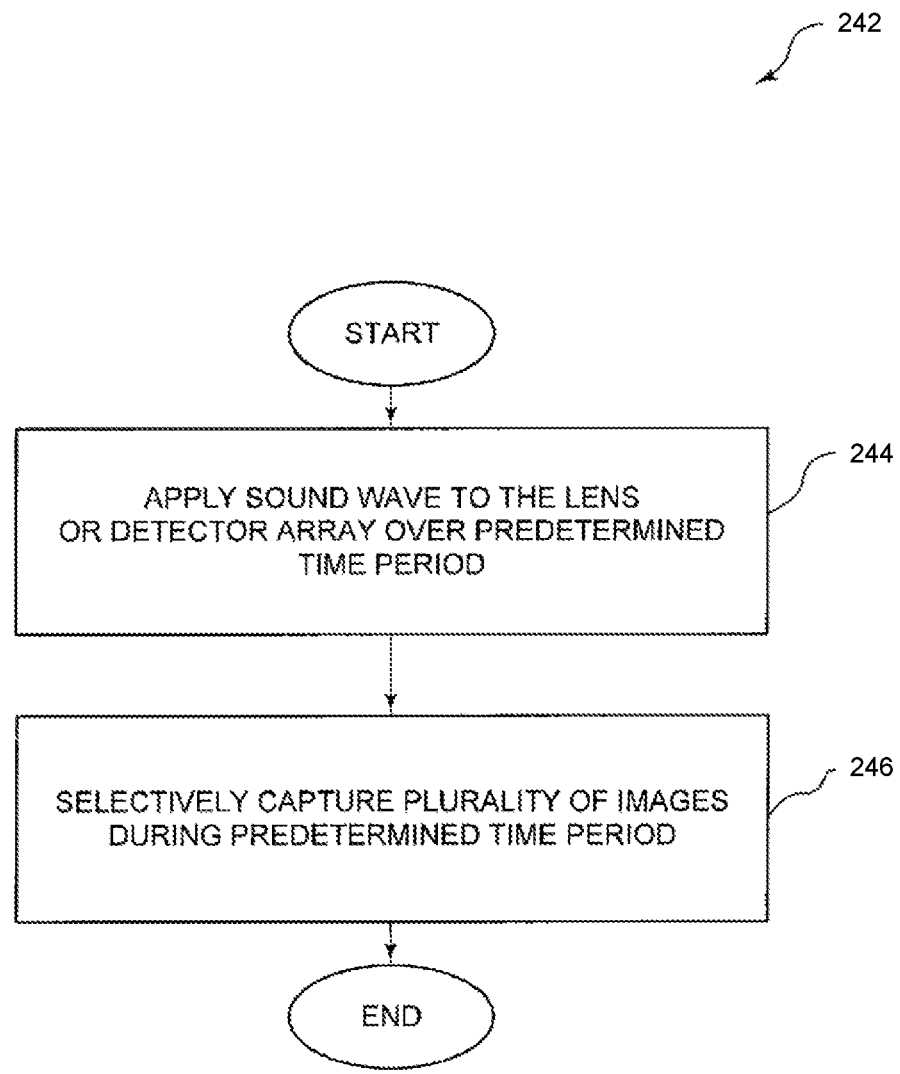
Figure 28:
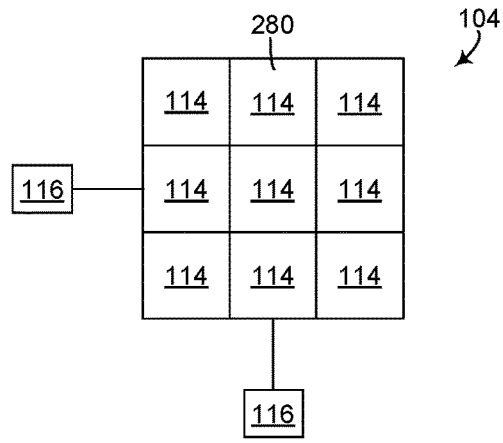
Figures 29, 30:
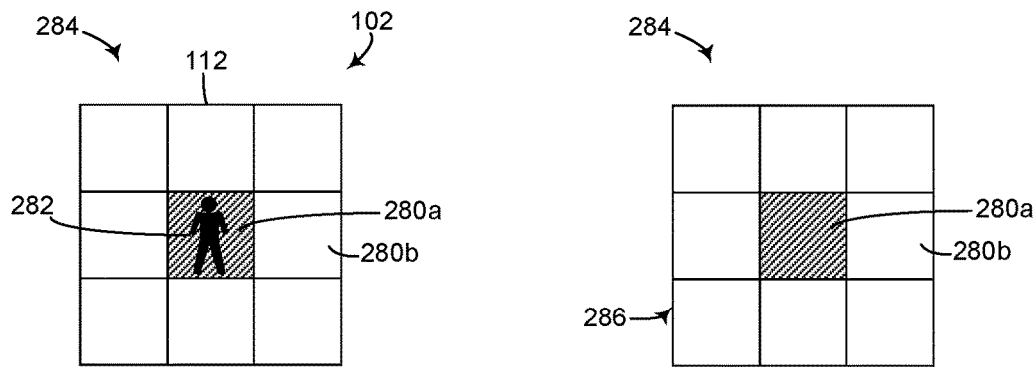
Figures 31, 32:
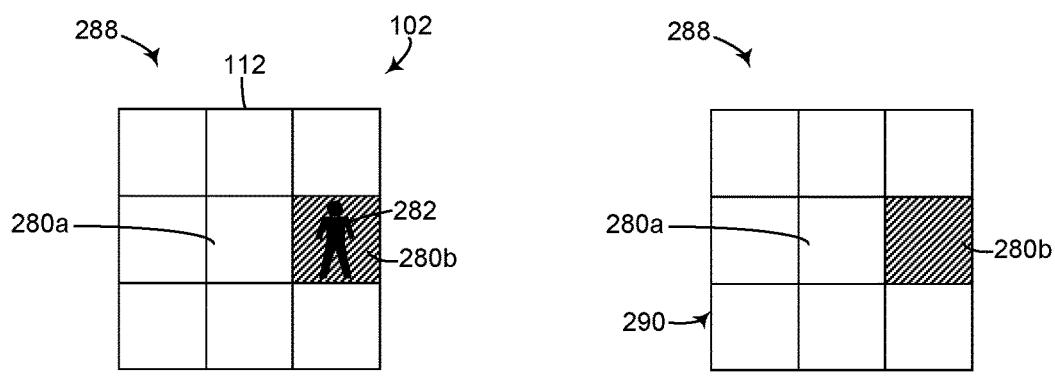
Figure 33:
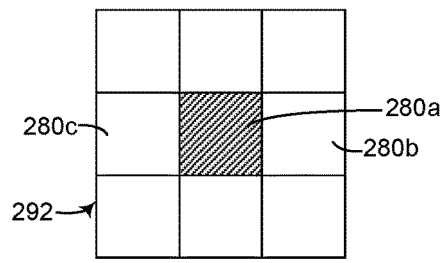
Figure 34:
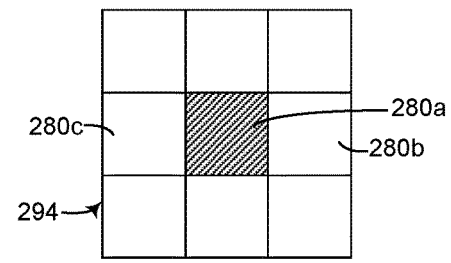
Figure 35:
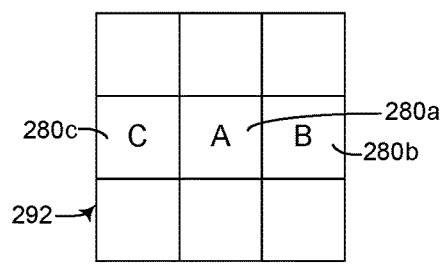
Figure 36:
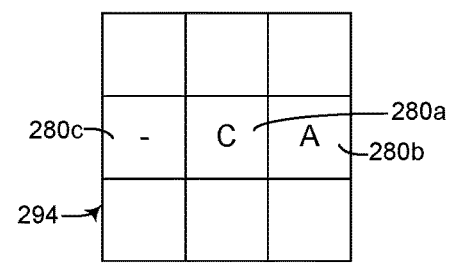
Figure 37:
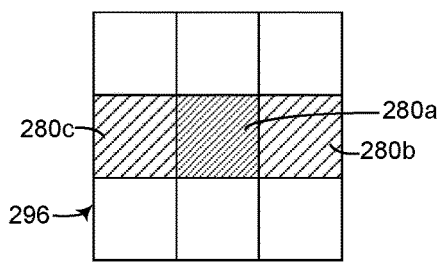
Figure 38:
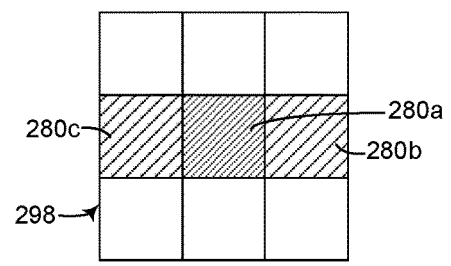
Figure 39:
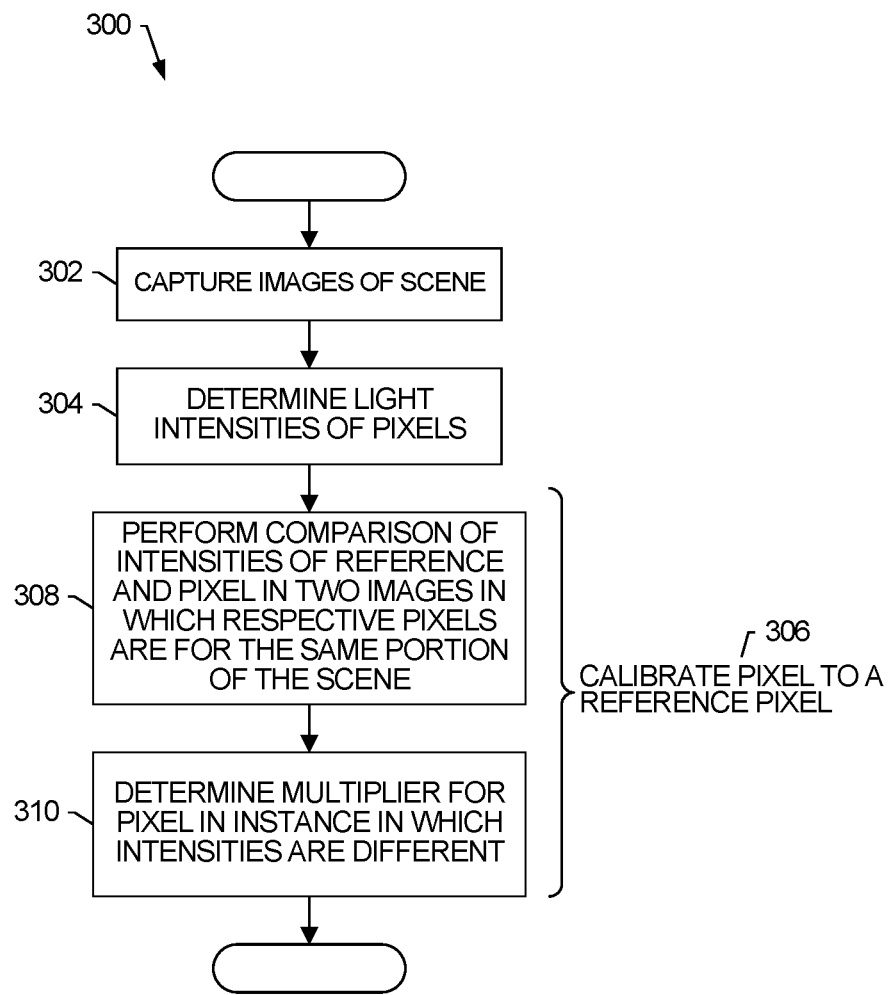
Figure 40:
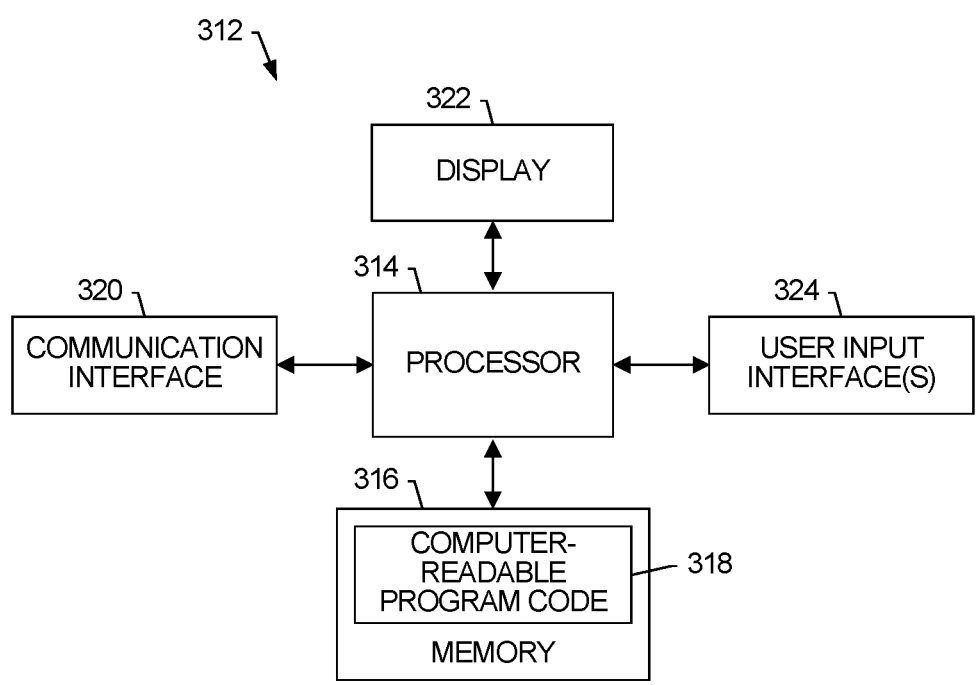

FIGS. 21, 22, and 23 are diagrammatic views of a detector in respectively an unstrained state, a maximum compressed stated, and a maximum stretched state, in accordance with various example implementations;

FIG. 24 is a diagrammatic view of a single image combined from the images of FIGS. 21-23, in accordance with another example implementation;

FIG. 25 is a schematic view of a camera system, in accordance with another example implementation;

FIGS. 26 and 27 are flowcharts illustrating respective processes for enhancing a resolution of a digital camera, in accordance with various example implementations;

FIG. 28 illustrates pixels for respective portions of a scene provided by individual detectors of a detector array, according to some example implementations;

FIGS. 29 and 30 are diagrammatic views of the detector array of FIG. 28 centrally aligned with a focus of a projected target image on a focal plane in a first position, and a first image captured by the detector array in the first position, according to some example implementations;

FIGS. 31 and 32 are diagrammatic views of the detector array in which the focal plane is shifted to a second position, and a second image captured by the detector array in the second position, according to some example implementations;

FIGS. 33 and 34 are diagrammatic views of first and last images in a sequence of four images captured by the detector array in first and last positions of four positions, according to some example implementations in which there is movement in the scene;

FIGS. 35 and 36 are diagrammatic views of portions of the scene in pixels of the first and last images of FIGS. 33 and 34, according to some example implementations;

FIGS. 37 and 38 are diagrammatic views of second and third images in the sequence of four images, interpolated from the first and last images of FIGS. 33 and 34, according to some example implementations in which there is movement in the scene;

FIG. 39 is a flowchart including various operations of a method of producing super resolution images, according to some example implementations; and FIG. 40 illustrates an apparatus according to some example implementations.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more, if not all, of these may be absolute or approximate to account for acceptable variations that may occur, such as those due to engineering tolerances or the like. Like reference numerals refer to like elements throughout.

Figure 1:
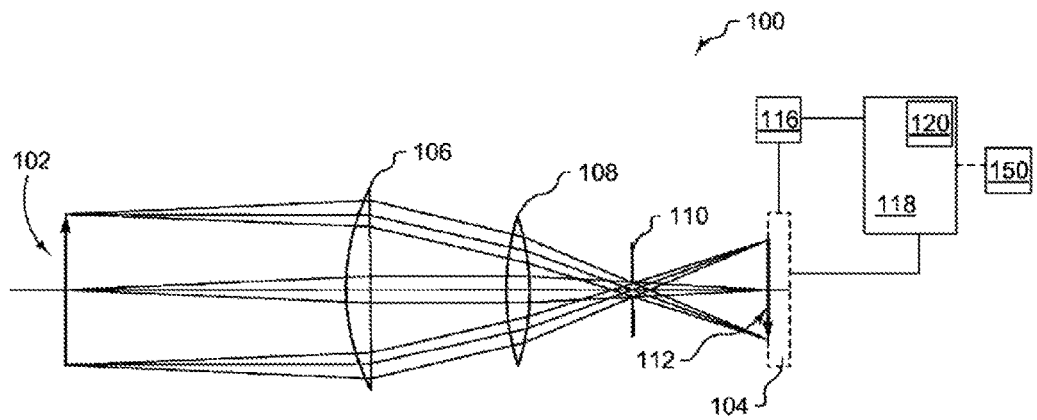
FIG. 1 is a schematic view of a camera system in accordance with one example implementation of the present disclosure.

FIG. 1 schematically illustrates a camera system 100 for producing super resolution digital images, in accordance with an example implementation of the present disclosure. With the camera system, a target image 102 of a scene may be captured by a detector array 104. For example, one or more lenses 106, 108, an aperture 110, or other optical elements (not shown) may focus light from the image 102 onto a focal plane 112. Positioned at the focal plane 112, the detector array 104 may be configured to detect an intensity of the light from the target image.

Figure 2:
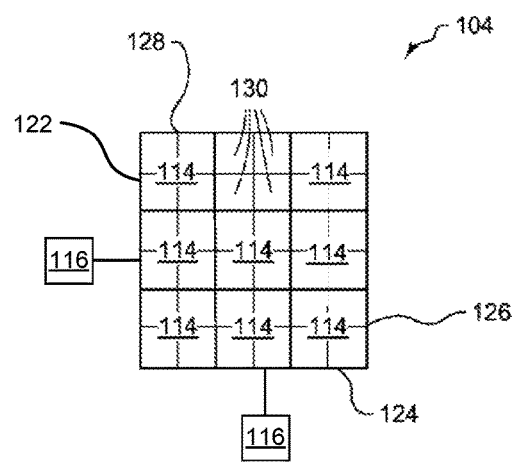
FIG. 2 is a diagrammatic view of a detector array of the camera system of FIG. 1.

Referring now to FIG. 2, with continued reference to FIG. 1, the detector array 104 may comprise an array of individual detectors 114 configured to record image data and thereby provide pixels for respective portions of the scene in the target image 102. For example, a detector may comprise a charge coupled device (CCD), a CMOS sensor, or other image sensor. Each detector may measure and store the light intensity, or photon count per unit time, at its location. The example detector array, in FIG. 2, illustrates a three-by-three (3×3) array of twenty micron (20µ) square detectors. However, the detector array is not limited to nine square detectors. Furthermore, other dimensions for the detector array and detectors may certainly be used.

In order to produce super resolution images, the camera system 100 may include one or more transducers 116 configured to convert electrical signals into mechanical energy. For example, the transducers may be coupled to the detector array 104, and may be configured to impart motion to the detector array 104. It is to be understood that although camera system 100 is shown and described as including a transducer 116, other means for imparting motion may also be used. By imparting motion to the detector array 104, while the target image 102, and the lenses 106, 108 remain stationary, the camera system 100 may capture a plurality of images over a predetermined time period. The plurality of images captured by the detector array 104 may then be combined into a single super resolution image.

The camera system 100 may also include a control unit 118 (FIG. 1) configured to control the detector array 104 and transducer 116. The control unit 118 may comprise a processor, such as a "computer processor," or processor-based device that may include or be associated with a non-transitory computer readable storage medium having stored thereon computer-executable instructions. One or more algorithms may be programmed into a memory 120 (FIG. 1) associated with the control unit. The memory may comprise a non-volatile memory. It is to be understood that the control unit may include other hardware, software, firmware, and combinations thereof.

According to one example implementation, the camera system 100 may include a move-based super resolution mode, or "move mode," preprogrammed into the memory 120 of the control unit 118. The move mode may shift the detector array 104 via transducers 116 to different positions relative to the focal plane 112 over a predetermined time period. Each time the detector array 104 is in a different position, the detector array 104 may capture an image, thereby accumulating a plurality of images over the predetermined time period.

For example, the transducers 116 may be composed of piezoelectric material. When the camera system 100 is in move mode, the control unit 118 send signals to one (or more) of the transducers 116 in order to move the detector array 104. In response, the piezoelectric transducer may convert the electrical energy from the signals into precise mechanical movement of the detector array 104. It is to be understood that other types of transducers 116 than piezoelectric transducers may be used as well.

As shown in FIG. 2, one transducer 116 may be coupled to a first vertical edge 122 of the detector array 104 in order to move the detector array in a horizontal direction (left and right). Another transducer 116 may be coupled to a first horizontal edge 124 of the detector array 104 in order to move the detector array in a vertical direction (up and down). However, the transducers 116 may certainly be coupled to a second vertical edge 126, a second horizontal edge 128, and/or other locations on the detector array 104. In addition, more or less than two transducers 116 may be used to move the detector array 104 in various directions.

Moreover, each transducer 116 may be further configured to move the detector array 104 in increments along the horizontal and vertical directions. Each increment may comprise a fraction of a length of an individual detector 114 in the detector array 104. To determine the fractional length of the increments, each detector 114 in the detector array 104 may be theoretically divided into smaller sub-pixels 130. In the example of FIG. 2, each twenty micron (20µ) square detector 114 is divided into four sub-pixels 130. More specifically, each detector 114 is segmented into a two-by-two array of ten micron (10µ) square sub-pixels 130.

In move mode, the detector array 104 may be shifted a length of a sub-pixel 130 in the horizontal direction and may be shifted a height of a sub-pixel 130 in the vertical direction. The length and height of the example sub-pixel 130, in FIG. 2, is ten microns (10µ). Thus, using the transducer 116, the detector array 104 may be moved half of a length of an individual detector 114 in the horizontal direction and may be moved half of a height of an individual detector 114. However, other arrangements of sub-pixels 130 are certainly possible, and therefore, other fractional lengths and increments may be used.

Figure 3:
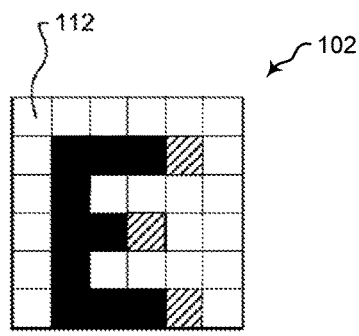
FIG. 3 is a diagrammatic view of a target image for the camera system of FIG. 1.
Figure 4:
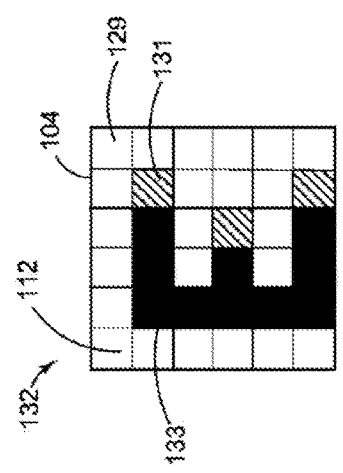
FIG. 4 is a diagrammatic view of the detector array of FIG. 2 centrally aligned with a focus of a projected target image on a focal plane in a first position.

Referring now to FIGS. 3-15, with continued reference to FIGS. 1 and 2, an example of the move mode in camera system 100 is illustrated. More specifically, as shown in FIG. 3, an example target image 102 may be focused onto focal plane 112. As shown in FIG. 4, the detector array 104 may be centrally aligned with a focus of the focal plane 112 when the detector array 104 is in a first position 132.

Figure 5:
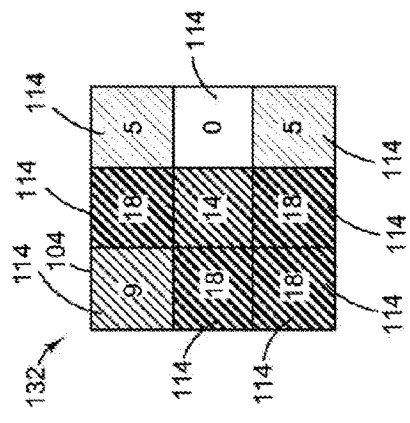

To capture an image in the first position 132, each individual detector 114 in the detector array 104 may detect a light intensity per unit time in a location of the detector. In this example, a white sub-pixel 129 may have a photon count of zero (0), a black sub-pixel 133 may have a photon count of nine (9), and a gray sub-pixel 131 may have a photon count of five (5). With this representative scale, the light intensities detected by each individual detector in the detector array are shown in FIG. 5.

Figure 6:
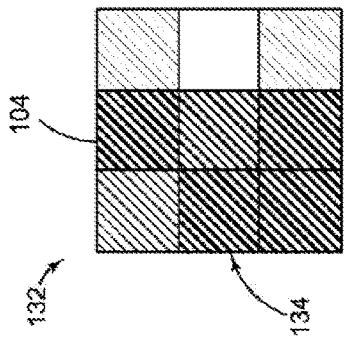
FIGS. 5 and 6 are diagrammatic views of respectively light intensities detected by individual detectors of the detector array, and a first image captured by the detector array, in the first position of FIG. 4.

Using the measured and stored photon counts, a first image 134 captured by the detector array 104 in the first position 132 is shown in FIG. 6. Comparing the first image, in FIG. 6, to the target image 102, in FIG. 3, demonstrates an inherent low resolution of the detector array 104. By itself, the detector array 104 is not sufficient to capture fine details of the target image 102.

Figure 9:
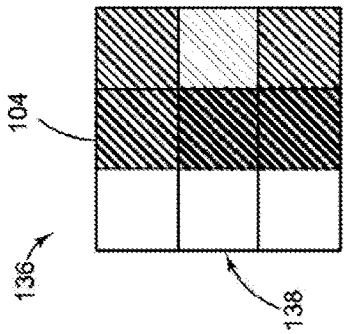
FIGS. 8 and 9 are diagrammatic views of respectively light intensities detected by individual detectors of the detector array, and a second image captured by the detector array, in the second position of FIG. 7.
Figure 8:
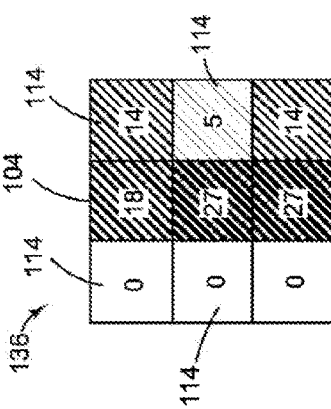
Figure 7:
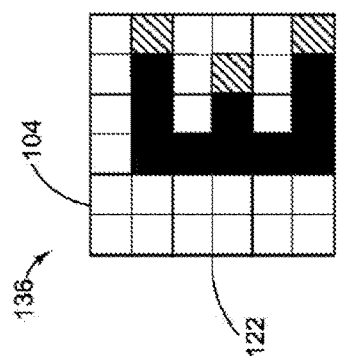
FIG. 7 is a diagrammatic view of the detector array shifted to a second position from the first position of FIG. 4.

However, using the move mode in the camera system 100 enables the detector array 104 to capture a plurality of images for super resolution enhancement. As shown in FIG. 7, the detector array 104 may be shifted to a second position 136. More specifically, the detector array 104 may be moved one increment in the horizontal direction of the first vertical edge 122 (or to the left of the focal plane 112). Light intensities detected by each individual detector 114 of the detector array 104 in the second position 136 are shown in FIG. 8. A second image 138 captured by the detector array 104 in the second position 136 is shown in FIG. 9.

In an iteration shown in FIG. 10, the detector array 104 may be shifted to a third position 140 where the detector array 104 is moved one increment in the vertical direction opposite the direction of the first horizontal edge 124 (or in an upward direction of the focal plane 112). Light intensities detected by each individual detector 114 of the detector array 104 in the third position 140 are shown in FIG. 11. A third image 142 captured by the detector array 104 in the third position 140 is shown in FIG. 12.

In a subsequent iteration, the detector array 104 may be shifted to a fourth position 144, shown in FIG. 13. The detector array 104 is moved one increment in the horizontal direction opposite the direction of the first vertical edge 122 (or to the right of the focal plane 112). Light intensities detected by each individual detector 114 of the detector array 104 in the fourth position 144 are shown in FIG. 14. A fourth image 146 captured by the detector array 104 in the fourth position 144 is shown in FIG. 15. To return to the first position 132, the detector array 104 may be moved one increment in the vertical direction of the first horizontal edge 124 (or in a downward direction of the focal plane 112).

The camera system 100 may further include a processing unit 150 (FIG. 1) configured to combine the plurality of images into a single super resolution image. The processing unit 150 may be integral to or separate from the control unit 118 of the camera system 100. In one example, the processing unit 150 may comprise a second processor associated with a second memory that is in communication with the control unit 118 and memory 120. For instance, the processing unit 150 may be included with the optics and control unit. Alternatively, the processing unit may be included on a separate component, such as, a personal computer (PC), used at a later time to process the plurality of images captured by the detector array.

Figure 16:
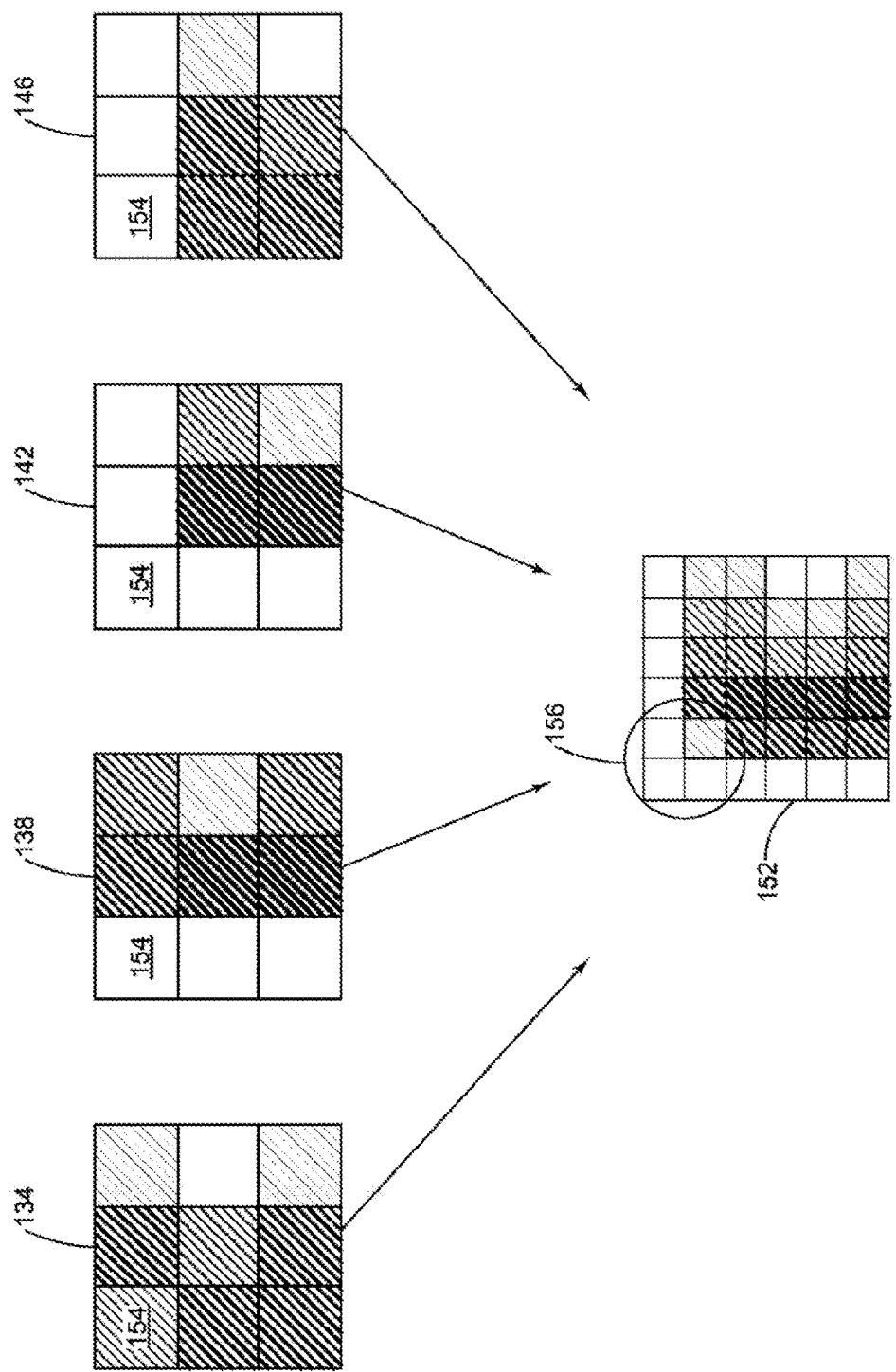
FIG. 16 is a diagrammatic view of an interleaving process performed on the first, second, third, and fourth images of FIGS. 6, 9, 12, and 15, in accordance with another example implementation.
Figures 19, 20:
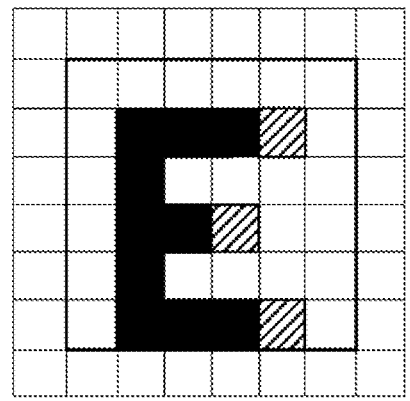
FIG. 19 is a diagrammatic view of a solution array from the linear algebra application in FIG. 18.
FIG. 20 is a diagrammatic view of a single super resolution image that resulted from the solution array of FIG. 19.

The processing unit 150 may combine the plurality of images into a single image 152 via an interleaving process. The processing unit may interleave the first image 134, the second image 138, the third image 142, and the fourth image 146 into a single super resolution image 152, as shown in FIG. 16, by arranging each of the intensities from each of the four images next to each other. For example, the intensities from a top left detector 154 of each image 134, 138, 142, 144 may be placed next to each other according to the position each was taken and displayed in a smaller size in a top left corner 156 of the single image 152.

Repeating the interleaving process for the rest of the detectors 114 in the detector array 104 results in the single image 152 having an enhanced resolution image that shows more feature definition than the original images. Namely, interleaving the four three-by-three (3×3) pixel images 134, 138, 142, 144 results in the single six-by-six (6×6) pixel image 152 and a two-by-two (2×2) resolution enhancement. It is to be understood that more than four images may be captured during the predetermined time period, thereby resulting in a higher resolution single image. The process illustrated and described above, in connection with FIGS. 3-16, may be repeated according to various predetermined resolution enhancement dimensions for any size (m×n) of sub-pixel arrays.

Referring now to FIGS. 17-20, with continued reference to FIGS. 1-16, the processing unit 150 may also combine the plurality of images using linear algebra. In order to form linear algebraic equations, each sub-pixel of a reference array 158 may be labelled with a variable index, such as that shown in FIG. 17. For instance, each sub-pixel of a six-by-six (6×6) array 160 may be assigned a variable a through aj (a, b, c, d, . . . ad, af, ai, aj), indicating that an intensity of the sub-pixel is unknown. Other variable indices and reference arrays than that shown in FIG. 17 may certainly be used.

Furthermore, when capturing the plurality of images, at least part of the detector array 104 may extend outside a boundary 162 of the target image 102 projected onto the focal plane 112 during at least part of the predetermined time period in move mode. The boundary 162 may be determined by the aperture 110, since the target image 102 is projected through the aperture 110 onto the focal plane 112. For example, in move mode, the detector array 104 may be shifted to certain positions that capture some images with the detector array 104 outside the boundary 162, resulting in the reference array 158 having a border 164 with light intensities of zero (0). Each sub-pixel of the border 164 may be a same size as the sub-pixels in the array 160.

More specifically, from the first position 132 when the detector array 104 is centrally aligned with the focus of the focal plane 112, the camera system 100, in move mode, may aim to move the detector array such that the border 164 having light intensities of zero (0) is captured. This is done by extending at least part of the detector array beyond the boundary 162 where no light is incident. In so doing, each sub-pixel of the border 164 may be labelled with the known light intensity of zero (0).

It is to be understood that although the border 164 is illustrated, in FIG. 17, as having two rows and two columns of zero intensity sub-pixels, other configurations for the border 164 may be used. For example, the border 164 may comprise only one row and one column of zero intensity sub-pixels.

By assigning a sub-pixel variable index and providing a border 164 of zero light intensity, the processing unit 150 can set up equations for the reference array 158 that are efficiently solved by linear algebra. As shown in an example for the top left detector 154, in FIG. 18, when applying the reference array to each of the first image 134, the second image 138, the third image 142, the fourth image 146, and their detected light intensities, the following equations may be established:

$$a+b+c+d=9$$

$$a+0+c+0=0$$

$$a+0+0=0$$

$$a+b+0+0=0$$

Using linear algebra to solve for variables a, b, c, and d, gives the following solution:

$$a=b=c=0, d=9$$

With variables a, b, c, and d solved, the processing unit 150 may iteratively solve for the other variables e through aj (e, f, g, . . . ai, aj). Determining the light intensities for each sub-pixel of the reference array 158 via linear algebra results in a solution array 166, shown in FIG. 19. Applying the representative scale for light intensity values (the white sub-pixel having a photon count of 0, the black sub-pixel having a photon count of 9, and the gray sub-pixel may having a photon count of 5) to the solution array leads to a single super resolution image 168, in FIG. 20. As shown, using linear algebra to combine the four images 134, 138, 142, 144 produces the single image 168 having four times the resolution as a camera system without move mode.

It is to be understood that the examples shown and described above, in FIGS. 2-20, are for explanatory purposes, and that the disclosed system 100 and techniques may be used with more or less iterations in order to achieve super resolution. The disclosed system and techniques may be used and modified according to various predetermined resolution enhancement dimensions for any size (m×n) of sub-pixel arrays.

In addition, the camera system 100 may impart motion to the detector array 104 in other ways. Although the motion imparted by the transducer 116 in the move mode physically shifts the entire detector array 104 to different positions, other types of motion may be imparted. For example, according to another example implementation, the camera system 100 may include a sonic-based super resolution mode, or "sonic mode," preprogrammed into the memory 120 of the control unit 118. The sonic mode may move the detector array 104 via sound, which is a vibration that propagates as a mechanical wave of pressure. Sound or pressure waves cause materials to strain. Therefore, when applied to the detector array 104, sound waves may change a size of the detector array 104.

In one example of the sonic mode, the transducer 116 may be a speaker transducer configured to induce sound waves across the detector array 104. In another example, similar to the move mode, the transducer 116 may be a piezoelectric transducer extending across the detector array 104. The piezoelectric transducer may be configured to stretch and compress the detector array, thereby inducing pressure waves across the detector array 104. By imparting motion to the detector array 104 through sound, a plurality of images may be captured at different sizes of the detector array over a predetermined time period.

Referring now to FIGS. 21-24, with continued reference to FIGS. 1-20, an example of the sonic mode in camera system 100 is illustrated on one detector 114. As shown in FIG. 21, in an unstrained state, the detector may be twenty microns (20μ) in length and may measure 200 photons per unit time in an image 170. With the target image 102 and the lenses 106, 108 remaining stationary, sound or pressure waves may be induced across the detector array 104 and each individual detector 114. If the transducer 116 is coupled to the first vertical edge 122 (FIG. 2) of the detector array 104, for example, the detector 114 will stretch and compress in the horizontal direction.

As shown in FIG. 22, in a maximum compressed state, the detector 114 may be compressed to eighteen microns (18μ) in length and may measure 140 photons per unit time in an image 172. In a maximum stretched state, shown in FIG. 23, the detector 114 may be twenty-two microns (22μ) in length and may measure 240 photons per unit time in an image 174. Combining the three images 170, 172, 174 together produces a single image 176 of variable intensity in the direction of sound wave propagation, as shown in FIG. 24.

More specifically, the photon counts captured in the unstrained state, the maximum compressed state, and the maximum stretched state from the three images 170, 172, 174 may be compared to each other in order to determine photon counts incident on sub-pixels 178 of the single image 176. The intensities from each of the sub-pixels are then combined to produce the super resolution image 176. It is to be understood that a collection of photon counts in different states during sound wave propagation other than the unstrained state, the maximum compressed state, and the maximum stretched state may also be acquired.

Various frequencies for the sound or pressure waves may be used. Furthermore, during the predetermined time period that the camera system 100 is in sonic mode, the detector 114 may measure the light intensities within predetermined time intervals when the detector 114 is unstrained, maximally compressed, and maximally stretched. Moreover, with the frequency of the sound wave being cyclical, a sampling of photon counts per unit time may be collected and averaged together.

In addition, using a different direction of sound wave propagation can enhance resolution in that direction. For example, with another transducer 116 coupled to the first horizontal edge 124 (FIG. 2) of the detector array 104, the detector 114 will stretch and compress in the vertical direction when sound is applied. Therefore, inducing sound waves in two perpendicular directions, e.g., horizontal and vertical, may result in a grid-type refinement. It is to be understood that sound wave propagation may be applied in directions other than horizontal and vertical. For example, a sound wave may be induced in a diagonal direction across the detector 114 and detector array 104. Furthermore, choosing various directions for sound wave propagation can allow for variable shapes, sizes, and intensity maps of the detector array 114, which may then be used to produce super resolution images.

In another example implementation, shown in FIG. 25, motion may be imparted to one or more of the lenses 106, 108 instead of the detector array 104 in order to achieve similar results as described above. For example, the lenses may move, while the target image 102 and the detector array 104 remain stationary. Imparting motion to the lenses moves the focus of the projected image on the focal plane 112 relative to the detector array 104. The detector array 104 may then capture a plurality of images during a predetermined time period in order to allow for super resolution enhancement.

For instance, one or more transducers 216 may be coupled to the lenses 106, 108. The transducers may be speaker transducers or piezoelectric transducers. In the move and sonic modes, the lenses 106, 108 may shift positions and change sizes. Changing the lens strain will change the direction in which light is bent, thereby changing the location of the photon paths on the detector array 104 when the target image 102 is not moving. By strategic choice of the distance to the focal plane and the sound intensity, the camera system 100 may be designed to provide super resolution over the entire focal plane 112.

Furthermore, mechanical vibration outside of the camera system 100 may affect the super resolution images. Therefore, accommodations to the camera system to eliminate an impact of vibration to super resolution images may be warranted.

In general, the foregoing disclosure finds utility in various applications relating to camera systems. In particular, the disclosed systems and techniques may be used to provide super resolution images. For example, the disclosed systems and techniques may be employed in, but not limited to, satellites, unmanned aerial vehicles (UAVs), and other surveillance platforms used for the purpose of intelligence, surveillance, and reconnaissance (ISR), and for other applications for use in both military and civilian environments.

By implementing the disclosed systems and techniques to digital camera systems, a cost-effective and efficient solution for improving resolution of an image is provided. The disclosed move-based super resolution mode and sonic-based super resolution mode may be easily implemented without significant expense. Each of the move mode and sonic mode may be turned on or off depending on whether super resolution images are desired.

Turning now to FIG. 26, with continued reference to FIGS. 1-25, a process 220 for enhancing a resolution of a digital camera system 100 having a lens 106, 108 and a detector array 104 is shown, in accordance with another example implementation of the present disclosure. At block 222, the detector array 104 captures a first image 134. At block 224, motion is imparted to one of the lens 106, 108 and the detector array 104. The detector array 104 captures another image 138 at block 226. Then, at block 228, the control unit 118 of the camera system 100 determines whether more images 142, 146 will be captured. Depending on predetermined resolution enhancement dimensions, more images 142, 146 may need to be captured. For instance, for a two-by-two (2×2) resolution enhancement, four images in different locations need to be captured. If more images need to be acquired, the process 220 proceeds to block 224 and repeats blocks 224 and 226 until all predetermined images are captured. If more images do not need to be acquired, then at block 230, the images 134, 138, 142, 146 are combined into a single image 152 having enhanced resolution.

Another process 242 for enhancing the resolution of the digital camera system is shown in FIG. 27. At block 244, a sound wave may be applied across one of the lens 106, 108 and the detector array 104 over a predetermined time period. At block 246, during the predetermined time period when the sound wave is applied, the detector array 104 selectively captures a plurality of images.

In some instances propagating aberrations in move-based super resolution image processing such as that described above may be caused by pixel-to-pixel sensitivity differences, moving objects in the scene being imaged and the like. To address these and perhaps other drawbacks, some example implementations calibrate pixels of the detector array 104 to a reference pixel to compensate for any differences in sensitivity of the individual detectors 114. If pixel sensitivity differences change only slowly, or if this is done in two-dimensions, motion within the scene can be determined and interpolated to determine its impact on each of the images in the sequence, which will reduce motion blur.

As described above, the detector array 104 includes an array of individual detectors 114 configured to provide pixels for respective portions of the scene in the target image 102. In accordance with some example implementations, the detector array is configured to capture images in increments in each of which the lens 106, 108 or the detector array 104 and thereby the focal plane 112 is moved a length of an individual detector 114 along a horizontal direction or a vertical direction as defined by a physical arrangement of the detector array 104. In some examples, this includes at least two increments, at least one increment in which the focal plane 112 is moved the length of the individual detector 114 along the horizontal direction, and at least one increment in which the focal plane 112 is moved the length of the individual detector 114 along the vertical direction. The processing unit 150 is configured to determine light intensities of the pixels in the images, and calibrate the pixels to a reference pixel of the pixels based on the light intensities and thereby compensate for any differences in sensitivity of the individual detectors 114.

In some examples, for each pixel of at least some of the pixels, the above calibration includes the processing unit 150 being configured to at least perform a comparison of a light intensity of the reference pixel of one of the images 102 and a light intensity of the pixel in an other of the images. In the one and the other of the images, the portion of the scene is the same for the reference pixel in the one of the images and the pixel in the other of the images. Based on this comparison, the processing unit 150 is configured to determine a multiplier for adjustment of the light intensity of the pixel at least in an instance in which the light intensity of the reference pixel and the light intensity of the pixel are different. In this regard, the multiplier is or is determined from a ratio of the light intensity of the reference pixel to the light intensity of the pixel.

To further illustrate calibration according to some examples, reference is made to FIGS. 28-32. FIG. 28 is similar to FIG. 2 but illustrates that the individual detectors 114 of the detector array 104 provide pixels 280 for respective portions of the scene including an object 282 (see FIG. 29) in the target image 102. As shown in FIG. 29, an example target image 102 is focused onto the focal plane 112, in which the detector array 104 is centrally aligned with a focus of the focal plane 112 when the detector array 104 is in a first position 284. To capture an image in the first position 284, each individual detector 114 in the detector array 104 may detect a light intensity per unit time in a location of the detector 114. In this example, one of the pixels 280a—a reference pixel—may have a photon count of nine (9), and the other pixels may have photon counts of zero (0). And using the measured and stored photon counts, a first image 286 captured by the detector array 104 in the first position 284 is shown in FIG. 30.

As shown in FIG. 31, the detector array 104 may be shifted the length of one individual detector 114 to a second position 288. More specifically, the detector array 104 may be moved one increment in the horizontal direction to the left of the focal plane 112. A second image 290 captured by the detector array 104 in the second position 288 is shown in FIG. 32. In the second image 290, the portion of the scene is the same for the reference pixel 280a in the first image 286 and a pixel 280b in the second image. But here, presume the pixel 280b has a photon count of eight (8) in the second image. That is, the number of photons counted by the pixel 280b is different than the number of photons counted by the reference pixel 280a when each pixel is exposed to the same portion of the scene. In this instance, the processing unit 150 may determine a multiplier for adjustment of the light intensity of the pixel 280b. And in some examples, the multiplier is a ratio of the light intensity of the reference pixel 280a to the light intensity of the pixel 280b (in this example, 9/8). The light intensity of this pixel 280b may then, during super resolution image processing, be multiplied by the multiplier to calibrate it to the reference pixel 280a.

In some examples, the processing unit 150 is configured to perform comparisons of the light intensity of the reference pixel 280a and the light intensity of the pixel 280b in respective pairs of the images 102 in which the portion of the scene is the same for the reference pixel 280a and the pixel 280b. In some of these examples, the processing unit 150 is configured to determine an average of the ratio of the light intensity of the reference pixel 280a to the light intensity of the pixel 280b for the respective pairs of images, and thereby determine the multiplier for adjustment of the light intensity of the pixel.

In some examples, for each other pixel of at least another some of the pixels, the calibration includes the processing unit 150 being configured to at least determine a ratio of a light intensity of the pixel in one of the images 102 to a light intensity of the other pixel in an other of the images. Similar to before, in the one and the other of the images, the portion of the scene is the same for the pixel in the one of the images and the other pixel in the other of the images. The processing unit 150 is then configured to determine a multiplier for adjustment of the light intensity of the other pixel. This multiplier is a product of the multiplier for adjustment of the light intensity of the pixel, and the ratio of the light intensity of the pixel to the light intensity of the other pixel.

In some examples the above process may be useful to identify faulty pixels that may be skipped or otherwise accounted for in subsequent calibration and/or super resolution image processing. More particularly, in some examples, for any particular pixel of the pixels, the processing unit 150 is configured to perform a comparison of the light intensity of the reference pixel in one of the images 102 and a light intensity of the particular pixel in an other of the images. Again, in the one and the other of the images the portion of the scene is the same for the reference pixel in the one of the images and the particular pixel in the other of the images. And in these examples, the processing unit is configured to identify the particular pixel as a faulty pixel in an instance in which the light intensity of the reference pixel and the light intensity of the particular pixel are different by more than a predetermined threshold that indicates a faulty pixel. In some examples, this predetermined threshold may be half or more of the light intensity of the reference pixel.

Regardless of the exact manner of calibration, the multipliers for the pixels may thereafter be used in super resolution imaging processing, such as that described above. In particular, for example, the transducer 116 is configured to move the lens 106, 108 or the detector array 104 and thereby the focal plane 112 over a predetermined time period during which the detector array 104 is configured to capture a plurality of images. The control unit 118 is configured to divide the pixels into sub-pixels and control the transducer to move the lens 106,108 or the detector array 104 in increments of a length of a sub-pixel during the predetermined time period. And the processing unit 150 is configured to determine light intensities of the pixels from the plurality of images and using the multiplier for each pixel of the at least some of the pixels, determine light intensities of the sub-pixels from the light intensities of the pixels, and combine the light intensities of the sub-pixels to produce a single image.

In some examples, the same process as is used for determining pixel sensitivity differences can be used to determine motion within the scene in the image 102, which can then be interpolated to determine its impact on each of the images in a sequence of images to reduce motion blur. In these examples, the plurality of images includes a sequence of images with a first image, a last image and at least one image therebetween. The processing unit 150, then, is further configured to at least perform a comparison of light intensities of at least one pair of pixels in the first image and the last image in which the portion of the scene is the same for the pair(s) of pixels in the first image and the last image. In at least one instance in which the light intensities of the pair(s) of pixels are different by more than a predetermined threshold that indicates movement in the scene, the processing unit is configured to determine light intensities of the pixels in the image(s) between the first image and the last image by interpolation from the light intensities of the pixels in the first image and the last image.

In some further examples in which the length of the sub-pixel corresponds to a fraction of a pixel, the processing unit 150 being configured to determine the light intensities of the pixels in the image(s) 102 between the first image and the last image includes being configured to at least interpolate light intensities for the respective portions of the scene in the image(s) based on light intensities of pixels for the respective portions of the scene in the first image and the last image. And it includes the processing unit being configured to determine the light intensities of the pixels in the image(s) based on fractions of the light intensities for the respective portions of the scene corresponding to fractions of the respective portions of the scene in the pixels in the image(s).

Again consider the example shown in FIGS. 29-32 in which the object 282 in the scene moves in the same direction and at the same rate as the focal plane 112. In this instance, a sequence of four images may be captured in increments of one-third the length of an individual detector 114 (three sub-pixels 130), and in the same time as the first and second images 286, 290 shown in FIGS. 29-32. In instances in which the object is stationary, one might expect the first and last images in the sequence to correspond to the first and second images. But in instances in which the object moves as described above, the first and last images may both appear the same as the first image 288. This is shown in FIGS. 33 and 34 for respectively a first image 292 and a last image 294 in a sequence of four images. A comparison the second image 290 (FIG. 32) without movement to the last image 294 (FIG. 34) with movement illustrates that movement in the scene causes different light intensities for the reference pixel 280a and the pixel 280b.

In this instance, although the portion of the scene is still the same for the reference pixel 280a and the pixel 280b in the first and last images, the light intensities of the pair of pixels are different by more than a predetermined threshold that indicates movement of the object 282 in the scene. The processing unit 150, then, may be configured to determine light intensities of the pixels 280 in the two images (second and third images) between the first image 292 and the last image 294 by interpolation from the light intensities of the pixels in the first image 292 and the last image 294.

More specifically, in some examples, this interpolation is done based on light intensities of pixels for the respective portions of the scene in the first image and the last image. Identifying an additional one of the pixels 280c in the example of FIGS. 33 and 34, portions of the scene in pixels 280a and 280c of the first image 292 are the same as in respectively pixels 280b and 280a of the last image 294. The portion of the scene in pixel 280b of the first image falls outside the last image 294, and an additional portion of the scene outside the first image comes into the last image. This is further illustrated in FIGS. 35 and 36 in which portions of the scene in pixels 280a, 280b and 280c in the first image 292 are represented by respectively "A," "B" and "C," and where those portions are then in pixels in the last image 294.

Again assuming the same photon counts as before, portions A, B and C of the scene have respective photon counts of 9, 0, 0 in the first image 292, and respective photon counts of 0, 0, 9 in the last image 294. By interpolation between the first image 292 and the last image 294, portions A. B and C of the scene have respective photon counts of 6, 0, 3 in the second image, and respective photon counts of 3, 0, 6 in the third image. In sum for the portions of the scene A, B and C:

|  | First Image | Second Image | Third Image | Last Image |
| --- | --- | --- | --- | --- |
| Scene Portion A | 9 | 6 | 3 | 0 |
| Scene Portion B | 0 | 0 | 0 | 0 |
| Scene Portion C | 0 | 3 | 6 | 9 |

Because the pixels are moved in increments of one-third from the first image 292 to the last image 294, in the second image, pixel 280a is made up of ($\frac{2}{3}$A+$\frac{1}{3}$C=5), pixel 280b is made up of ($\frac{2}{3}$B+$\frac{1}{3}$A=2), and pixel 280c is made up of ($\frac{2}{3}$C=2). In the third image, pixel 280a is made up of ($\frac{1}{3}$A+$\frac{2}{3}$C=5), pixel 280b is made up of ($\frac{1}{3}$B+$\frac{2}{3}$A=2), and pixel 280c is made up of ($\frac{1}{3}$C=2). In sum for pixels 280a, 280b and 280c:

|  | First Image | Second Image | Third Image | Last Image |
| --- | --- | --- | --- | --- |
| Pixel 280a | 9 | 5 | 5 | 9 |
| Pixel 280b | 0 | 2 | 2 | 0 |
| Pixel 280c | 0 | 2 | 2 | 0 |

And using the above photon counts, FIGS. 37 and 38 illustrate respectively the second image 296 and the third image 298.

FIG. 39 illustrates a flowchart including various operations of a method 300 of producing super resolution images, according to some example implementations of the present disclosure. At block 302, the method includes capturing, by a detector array 104, images of a scene focused through a lens 106, 108 onto a focal plane 112. The detector array 104 includes an array of individual detectors 114 providing pixels for respective portions of the scene. The detector array 104 captures the images in increments in each of which the lens 106, 108 or the detector array 104 and thereby the focal plane 112 is moved a length of an individual detector 114 along a horizontal direction or a vertical direction as defined by a physical arrangement of the detector array 104.

At block 304 and at 306, the method includes determining, by a processing unit 150, light intensities of the pixels in the images, and calibrating the pixels to a reference pixel of the pixels based on the light intensities and thereby compensate for any differences in sensitivity of the individual detectors 114. For each pixel of at least some of the pixels, calibrating the pixel includes at least, at block 308, performing a comparison of a light intensity of the reference pixel of one of the images and a light intensity of the pixel in an other of the images in which the portion of the scene is the same for the reference pixel in the one of the images and the pixel in the other of the images. And calibrating the pixel includes based on the comparison, and at block 310, determining a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel.

In some examples, one or more apparatuses may be provided that are configured to function as or otherwise implement either or both of the control unit 118 or processing unit 150 shown and described herein. In examples involving more than one apparatus, the respective apparatuses may be connected to or otherwise in communication with one another in a number of different manners, such as directly or indirectly via a wired or wireless network or the like.

FIG. 40 more particularly illustrates an apparatus 312 according to some example implementations. Generally, an apparatus of example implementations of the present disclosure may comprise, include or be embodied in one or more fixed or portable electronic devices. The apparatus may include one or more of each of a number of components such as, for example, a processor 314 connected to a memory 316 (e.g., storage device).

The processor 314 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 316 (of the same or another apparatus).

The processor 314 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs). FPGAs or the like. Thus, although the processor may be capable of executing a computer program to perform one or more functions, the processor of various examples may be capable of performing one or more functions without the aid of a computer program.

The memory 316 is generally any piece of computer hardware that is capable of storing information such as, for example, data, computer programs (e.g., computer-readable program code 318) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W). DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communication interface 320 (e.g., communications unit) and/or one or more user interfaces. The communication interface may be configured to transmit and/or receive information, such as to and/or from other apparatus (es), network(s) or the like. The communication interface may be configured to transmit and/or receive information by physical (wired) and/or wireless communications links. Examples of suitable communication interfaces include a network interface controller (NIC), wireless NIC (WNIC) or the like.

The user interfaces may include a display 322 and/or one or more user input interfaces 324 (e.g., input/output unit). The display may be configured to present or otherwise display information to a user, suitable examples of which include a liquid crystal display (LCD), light-emitting diode display (LED), plasma display panel (PDP) or the like.

The user input interfaces 324 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 312 may include a processor 314 and a computer-readable storage medium or memory 316 coupled to the processor, where the processor is configured to execute computer-readable program code 318 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A camera system for producing super resolution images, the camera system comprising:
a lens;
an array of image sensors configured to capture images of a scene focused through the lens onto a focal plane, the array of image sensors being configured to provide pixels for respective portions of the scene and capture the images in increments in each of which the lens or the array of image sensors and thereby the focal plane is moved a length of an individual image sensor of the array of image sensors along a horizontal direction or a vertical direction as defined by a physical arrangement of the array of image sensors; and
a processor configured to determine light intensities of the pixels in the images, and calibrate the pixels to a reference pixel of the pixels based on the light intensities and thereby compensate for any differences in sensitivity of the image sensors, wherein for each pixel of at least some of the pixels, the processor being configured to calibrate the pixel includes being configured to at least:
perform a comparison of a light intensity of the reference pixel of one of the images and a light intensity of the pixel in an other of the images in which the portion of the scene is the same for the reference pixel in the one of the images and the pixel in the other of the images; and based thereon,
determine a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel; and multiply the light intensity of the pixel by the multiplier.

2. The camera system of claim 1, wherein the array of image sensors being configured to capture the images in increments includes being configured to capture the images in at least two increments, including at least one increment in which the focal plane is moved the length of the individual image sensor along the horizontal direction, and at least one increment in which the focal plane is moved the length of the individual image sensor along the vertical direction.

3. The camera system of claim 1 further comprising:
a transducer coupled to the lens or the array of image sensors, and configured to move the lens or the array of image sensors and thereby the focal plane; and
a control unit in communication with the transducer, and configured to control the transducer to move the lens or the array of image sensors.

4. The camera system of claim 3, wherein the camera system is configured to produce a super resolution image after calibration of the pixels, and in which:
the transducer is configured to move the lens or the array of image sensors and thereby the focal plane over a predetermined time period during which the array of image sensors is configured to capture a plurality of images;
the control unit is configured to divide the pixels into sub-pixels and control the transducer to move the lens or the array of image sensors in increments of a length of a sub-pixel during the predetermined time period; and
the processor is configured to determine light intensities of the pixels from the plurality of images and using the multiplier for each pixel of the at least some of the pixels, determine light intensities of the sub-pixels from the light intensities of the pixels, and combine the light intensities of the sub-pixels to produce a single image.

5. The camera system of claim 4, wherein the plurality of images includes a sequence of images with a first image, a last image and at least one image therebetween, and the processor is further configured to at least:
perform a comparison of light intensities of at least one pair of pixels in the first image and the last image in which the portion of the scene is the same for the at least one pair of pixels in the first image and the last image, and
wherein in at least one instance in which the light intensities of the at least one pair of pixels are different by more than a predetermined threshold that indicates movement in the scene, the processor being configured to determine the light intensities of the pixels includes being configured to determine light intensities of the pixels in the at least one image between the first image and the last image by interpolation from the light intensities of the pixels in the first image and the last image.

6. The camera system of claim 5, wherein the length of the sub-pixel corresponds to a fraction of a pixel, and the processor being configured to determine the light intensities of the pixels in the at least one image includes being configured to at least:

interpolate light intensities for the respective portions of the scene in the at least one image based on light intensities of pixels for the respective portions of the scene in the first image and the last image; and
determine the light intensities of the pixels in the at least one image based on fractions of the light intensities for the respective portions of the scene corresponding to fractions of the respective portions of the scene in the pixels in the at least one image.

7. A camera system for producing super resolution images, the camera system comprising:
a lens;
an array of image sensors configured to capture images of a scene focused through the lens onto a focal plane, the array of image sensors being configured to provide pixels for respective portions of the scene and capture the images in increments in each of which the lens or the array of image sensors and thereby the focal plane is moved a length of an individual image sensor of the array of image sensors along a horizontal direction or a vertical direction as defined by a physical arrangement of the array of image sensors; and
a processor configured to determine light intensities of the pixels in the images, and calibrate the pixels to a reference pixel of the pixels based on the light intensities and thereby compensate for any differences in sensitivity of the image sensors, wherein for each pixel of at least some of the pixels, the processor being configured to calibrate the pixel includes being configured to at least:
perform a comparison of a light intensity of the reference pixel of one of the images and a light intensity of the pixel in an other of the images in which the portion of the scene is the same for the reference pixel in the one of the images and the pixel in the other of the images, and based thereon,
determine a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel,
wherein for each other pixel of at least another some of the pixels, the processor being configured to calibrate the other pixel includes being configured to at least:
determine a ratio of a light intensity of the pixel in one of the images to a light intensity of the other pixel in an other of the images in which the portion of the scene is the same for the pixel in the one of the images and the other pixel in the other of the images; and
determine a multiplier for adjustment of the light intensity of the other pixel, the multiplier being a product of the multiplier for adjustment of the light intensity of the pixel, and the ratio of the light intensity of the pixel to the light intensity of the other pixel.

8. The camera system of claim 7, wherein the processor being configured to perform the comparison includes being configured to perform comparisons of the light intensity of the reference pixel and the light intensity of the pixel in respective pairs of the images in which the portion of the scene is the same for the reference pixel and the pixel, and
wherein the processor being configured to determine the multiplier includes being configured to determine an average of the ratio of the light intensity of the reference pixel to the light intensity of the pixel for the respective pairs of images.

9. The camera system of claim 7, wherein for any particular pixel of the pixels, the processor is configured to:
perform a comparison of the light intensity of the reference pixel in one of the images and a light intensity of the particular pixel in an other of the images in which the portion of the scene is the same for the reference pixel in the one of the images and the particular pixel in the other of the images; and
identify the particular pixel as a faulty pixel in an instance in which the light intensity of the reference pixel and the light intensity of the particular pixel are different by more than a predetermined threshold that indicates a faulty pixel.

10. The camera system of claim 7, wherein the processor being configured to perform the comparison includes being configured to perform comparisons of the light intensity of the reference pixel and the light intensity of the pixel in respective pairs of the images in which the portion of the scene is the same for the reference pixel and the pixel,
wherein the processor being configured to determine the multiplier includes being configured to determine an average of the ratio of the light intensity of the reference pixel to the light intensity of the pixel for the respective pairs of images, and
wherein for any particular pixel of the pixels, the processor is configured to:
perform a comparison of the light intensity of the reference pixel in one of the images and a light intensity of the particular pixel in an other of the images in which the portion of the scene is the same for the reference pixel in the one of the images and the particular pixel in the other of the images; and
identify the particular pixel as a faulty pixel in an instance in which the light intensity of the reference pixel and the light intensity of the particular pixel are different by more than a predetermined threshold that indicates a faulty pixel.

11. A camera system for producing super resolution images, the camera system comprising:
a lens;
an array of image sensors configured to capture images of a scene focused through the lens onto a focal plane, the array of image sensors being configured to provide pixels for respective portions of the scene and capture the images in increments in each of which the lens or the array of image sensors and thereby the focal plane is moved a length of an individual image sensor of the array of image sensors along a horizontal direction or a vertical direction as defined by a physical arrangement of the array of image sensors; and
a processor configured to determine light intensities of the pixels in the images, and calibrate the pixels to a reference pixel of the pixels based on the light intensities and thereby compensate for any differences in sensitivity of the image sensors, wherein for each pixel of at least some of the pixels, the processor being configured to calibrate the pixel includes being configured to at least:
perform a comparison of a light intensity of the reference pixel of one of the images and a light intensity of the pixel in an other of the images in which the portion of the scene is the same for the reference pixel in the one of the images and the pixel in the other of the images, wherein the processor being configured to perform the comparison includes being configured to perform comparisons of the light intensity of the reference pixel and the light intensity of the pixel in respective pairs of the images in which the portion of the scene is the same for the reference pixel and the pixel; and based thereon,
determine a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel, wherein the processor being configured to determine the multiplier includes being configured to determine an average of the ratio of the light intensity of the reference pixel to the light intensity of the pixel for the respective pairs of images.

12. The camera system of claim 11, wherein for any particular pixel of the pixels, the processor is configured to:
perform a comparison of the light intensity of the reference pixel in one of the images and a light intensity of the particular pixel in an other of the images in which the portion of the scene is the same for the reference pixel in the one of the images and the particular pixel in the other of the images; and
identify the particular pixel as a faulty pixel in an instance in which the light intensity of the reference pixel and the light intensity of the particular pixel are different by more than a predetermined threshold that indicates a faulty pixel.

13. A camera system for producing super resolution images, the camera system comprising:
a lens;
an array of image sensors configured to capture images of a scene focused through the lens onto a focal plane, the array of image sensors being configured to provide pixels for respective portions of the scene and capture the images in increments in each of which the lens or the array of image sensors and thereby the focal plane is moved a length of an individual image sensor of the array of image sensors along a horizontal direction or a vertical direction as defined by a physical arrangement of the array of image sensors; and
a processor configured to determine light intensities of the pixels in the images, and calibrate the pixels to a reference pixel of the pixels based on the light intensities and thereby compensate for any differences in sensitivity of the image sensors, wherein for each pixel of at least some of the pixels, the processor being configured to calibrate the pixel includes being configured to at least:
perform a comparison of a light intensity of the reference pixel of one of the images and a light intensity of the pixel in an other of the images in which the portion of the scene is the same for the reference pixel in the one of the images and the pixel in the other of the images, and based thereon,
determine a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel,
wherein for any particular pixel of the pixels, the processor is configured to:
perform a comparison of the light intensity of the reference pixel in one of the images and a light intensity of the particular pixel in an other of the images in which the portion of the scene is the same for the reference pixel in the one of the images and the particular pixel in the other of the images; and identify the particular pixel as a faulty pixel in an instance in which the light intensity of the reference pixel and the light intensity of the particular pixel are different by more than a predetermined threshold that indicates a faulty pixel.

14. A method of producing super resolution images, the method comprising:

capturing, by an array of image sensors, images of a scene focused through a lens onto a focal plane, the array of image sensors providing pixels for respective portions of the scene and capturing the images in increments in each of which the lens or the array of image sensors and thereby the focal plane is moved a length of an individual image sensor of the array of image sensors along a horizontal direction or a vertical direction as defined by a physical arrangement of the array of image sensors; and determining, by a processor, light intensities of the pixels in the images, and calibrating the pixels to a reference pixel of the pixels based on the light intensities and thereby compensate for any differences in sensitivity of the image sensor, wherein for each pixel of at least some of the pixels, calibrating the pixel including at least:

performing a comparison of a light intensity of the reference pixel of one of the images and a light intensity of the pixel in an other of the images in which the portion of the scene is the same for the reference pixel in the one of the images and the pixel in the other of the images, and based thereon, determining a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel; and multiplying the light intensity of the pixel by the multiplier.

15. The method of claim 14, wherein capturing the images in increments includes capturing the images in at least two increments, including at least one increment in which the focal plane is moved the length of the individual image sensor along the horizontal direction, and at least one increment in which the focal plane is moved the length of the individual image sensor along the vertical direction.

16. The method of claim 14 further comprising:

moving, by a transducer coupled to the lens or the array of image sensors, the lens or the array of image sensors and thereby the focal plane; and controlling, by a control unit in communication with the transducer, the transducer to move the lens or the array of image sensors.

17. The method of claim 16 further comprising producing a super resolution image after calibration of the pixels, and including:

moving, by the transducer, the lens or the array of image sensors and thereby the focal plane over a predetermined time period during which the array of image sensors captures a plurality of images;

dividing, by the control unit, the pixels into sub-pixels and controlling the transducer to move the lens or the array of image sensors in increments of a length of a sub-pixel during the predetermined time period; and determining, by the processor, light intensities of the pixels from the plurality of images and using the multiplier for each pixel of the at least some of the pixels, determining light intensities of the sub-pixels from the light intensities of the pixels, and combining the light intensities of the sub-pixels to produce a single image.

18. The method of claim 17, wherein the plurality of images includes a sequence of images with a first image, a last image and at least one image therebetween, and the method further includes at least:

performing a comparison of light intensities of at least one pair of pixels in the first image and the last image in which the portion of the scene is the same for the at least one pair of pixels in the first image and the last image, and wherein in at least one instance in which the light intensities of the at least one pair of pixels are different by more than a predetermined threshold that indicates movement in the scene, determining the light intensities of the pixels includes determining light intensities of the pixels in the at least one image between the first image and the last image by interpolation from the light intensities of the pixels in the first image and the last image.

19. The method of claim 18, wherein the length of the sub-pixel corresponds to a fraction of a pixel, and determining the light intensities of the pixels in the at least one image includes at least:

interpolating light intensities for the respective portions of the scene in the at least one image based on light intensities of pixels for the respective portions of the scene in the first image and the last image; and determining the light intensities of the pixels in the at least one image based on fractions of the light intensities for the respective portions of the scene corresponding to fractions of the respective portions of the scene in the pixels in the at least one image.

20. A method of producing super resolution images, the method comprising:

capturing, by an array of image sensors, images of a scene focused through a lens onto a focal plane, the array of image sensors providing pixels for respective portions of the scene and capturing the images in increments in each of which the lens or the array of image sensors and thereby the focal plane is moved a length of an individual image sensor of the array of image sensors along a horizontal direction or a vertical direction as defined by a physical arrangement of the array of image sensors; and determining, by a processor, light intensities of the pixels in the images, and calibrating the pixels to a reference pixel of the pixels based on the light intensities and thereby compensate for any differences in sensitivity of the image sensors, wherein for each pixel of at least some of the pixels, calibrating the pixel including at least:

performing a comparison of a light intensity of the reference pixel of one of the images and a light intensity of the pixel in an other of the images in which the portion of the scene is the same for the reference pixel in the one of the images and the pixel in the other of the images; and based thereon, determining a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel, wherein for each other pixel of at least another some of the pixels, calibrating the other pixel includes being at least:

determining a ratio of a light intensity of the pixel in one of the images to a light intensity of the other pixel in an other of the images in which the portion of the scene is the same for the pixel in the one of the images and the other pixel in the other of the images; and determining a multiplier for adjustment of the light intensity of the other pixel, the multiplier being a product of the multiplier for adjustment of the light intensity of the pixel, and the ratio of the light intensity of the pixel to the light intensity of the other pixel.

21. The method of claim 20, wherein performing the comparison includes performing comparisons of the light intensity of the reference pixel and the light intensity of the pixel in respective pairs of the images in which the portion of the scene is the same for the reference pixel and the pixel, and wherein determining the multiplier includes determining an average of the ratio of the light intensity of the reference pixel to the light intensity of the pixel for the respective pairs of images.

22. The method of claim 20, wherein for any particular pixel of the pixels, the method includes:

performing a comparison of the light intensity of the reference pixel in one of the images and a light intensity of the particular pixel in an other of the images in which the portion of the scene is the same for the reference pixel in the one of the images and the particular pixel in the other of the images; and identifying the particular pixel as a faulty pixel in an instance in which the light intensity of the reference pixel and the light intensity of the particular pixel are different by more than a predetermined threshold that indicates a faulty pixel.

23. The method of claim 20, wherein performing the comparison includes performing comparisons of the light intensity of the reference pixel and the light intensity of the pixel in respective pairs of the images in which the portion of the scene is the same for the reference pixel and the pixel, wherein determining the multiplier includes determining an average of the ratio of the light intensity of the reference pixel to the light intensity of the pixel for the respective pairs of images, and wherein for any particular pixel of the pixels, the method includes:

performing a comparison of the light intensity of the reference pixel in one of the images and a light intensity of the particular pixel in an other of the images in which the portion of the scene is the same for the reference pixel in the one of the images and the particular pixel in the other of the images; and identifying the particular pixel as a faulty pixel in an instance in which the light intensity of the reference pixel and the light intensity of the particular pixel are different by more than a predetermined threshold that indicates a faulty pixel.

24. A method of producing super resolution images, the method comprising:

capturing, by an array of image sensors, images of a scene focused through a lens onto a focal plane, the array of image sensors providing pixels for respective portions of the scene and capturing the images in increments in each of which the lens or the array of image sensors and thereby the focal plane is moved a length of an individual image sensor of the array of image sensors along a horizontal direction or a vertical direction as defined by a physical arrangement of the array of image sensors; and determining, by a processor, light intensities of the pixels in the images, and calibrating the pixels to a reference pixel of the pixels based on the light intensities and thereby compensate for any differences in sensitivity of the image sensors, wherein for each pixel of at least some of the pixels, calibrating the pixel including at least:

performing a comparison of a light intensity of the reference pixel of one of the images and a light intensity of the pixel in an other of the images in which the portion of the scene is the same for the reference pixel in the one of the images and the pixel in the other of the images, wherein performing the comparison includes performing comparisons of the light intensity of the reference pixel and the light intensity of the pixel in respective pairs of the images in which the portion of the scene is the same for the reference pixel and the pixel; and based thereon, determining a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel, wherein determining the multiplier includes determining an average of the ratio of the light intensity of the reference pixel to the light intensity of the pixel for the respective pairs of images.

25. The method of claim 24, wherein for any particular pixel of the pixels, the method includes:

performing a comparison of the light intensity of the reference pixel in one of the images and a light intensity of the particular pixel in an other of the images in which the portion of the scene is the same for the reference pixel in the one of the images and the particular pixel in the other of the images; and identifying the particular pixel as a faulty pixel in an instance in which the light intensity of the reference pixel and the light intensity of the particular pixel are different by more than a predetermined threshold that indicates a faulty pixel.

26. A method of producing super resolution images, the method comprising:

capturing, by an array of image sensors, images of a scene focused through a lens onto a focal plane, the array of image sensors providing pixels for respective portions of the scene and capturing the images in increments in each of which the lens or the array of image sensors and thereby the focal plane is moved a length of an individual image sensor of the array of image sensors along a horizontal direction or a vertical direction as defined by a physical arrangement of the array of image sensors; and determining, by a processor, light intensities of the pixels in the images, and calibrating the pixels to a reference pixel of the pixels based on the light intensities and thereby compensate for any differences in sensitivity of the image sensors, wherein for each pixel of at least some of the pixels, calibrating the pixel including at least:

performing a comparison of a light intensity of the reference pixel of one of the images and a light intensity of the pixel in an other of the images in which the portion of the scene is the same for the reference pixel in the one of the images and the pixel in the other of the images; and based thereon, determining a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel, wherein for any particular pixel of the pixels, the method includes:

performing a comparison of the light intensity of the reference pixel in one of the images and a light intensity of the particular pixel in an other of the images in which the portion of the scene is the same for the reference pixel in the one of the images and the particular pixel in the other of the images; and identifying the particular pixel as a faulty pixel in an instance in which the light intensity of the reference pixel and the light intensity of the particular pixel are different by more than a predetermined threshold that indicates a faulty pixel.

27. A computer-readable storage medium for producing super resolution images, the computer-readable storage medium being non-transitory and having computer-readable program code portions stored therein that in response to execution by a processor, cause an apparatus to at least:

determine light intensities of pixels in images of a scene from by an array of image sensors configured to capture the images focused through a lens onto a focal plane, the array of image sensors being configured to provide the pixels for respective portions of the scene and capture the images in increments in each of which the lens or the array of image sensors and thereby the focal plane is moved a length of an individual image sensor of the array of image sensors along a horizontal direction or a vertical direction as defined by a physical arrangement of the array of image sensors; and calibrate the pixels to a reference pixel of the pixels based on the light intensities and thereby compensate for any differences in sensitivity of the image sensors, wherein for each pixel of at least some of the pixels, the apparatus being caused to calibrate the pixel includes being caused to at least:

perform a comparison of a light intensity of the reference pixel of one of the images and a light intensity of the pixel in an other of the images in which the portion of the scene is the same for the reference pixel in the one of the images and the pixel in the other of the images; and based thereon, determine a multiplier for adjustment of the light intensity of the pixel at least in an instance in which the light intensity of the reference pixel and the light intensity of the pixel are different, the multiplier being or being determined from a ratio of the light intensity of the reference pixel to the light intensity of the pixel; and multiply the light intensity of the pixel by the multiplier.

28. The computer-readable storage medium of claim 27, wherein for each other pixel of at least another some of the pixels, the apparatus being caused to calibrate the other pixel includes being caused to at least:

determine a ratio of a light intensity of the pixel in one of the images to a light intensity of the other pixel in an other of the images in which the portion of the scene is the same for the pixel in the one of the images and the other pixel in the other of the images; and determine a multiplier for adjustment of the light intensity of the other pixel, the multiplier being a product of the multiplier for adjustment of the light intensity of the pixel, and the ratio of the light intensity of the pixel to the light intensity of the other pixel.

29. The computer-readable storage medium of claim 27, wherein the apparatus being caused to perform the comparison includes being caused to perform comparisons of the light intensity of the reference pixel and the light intensity of the pixel in respective pairs of the images in which the portion of the scene is the same for the reference pixel and the pixel, and wherein the apparatus being caused to determine the multiplier includes being caused to determine an average of the ratio of the light intensity of the reference pixel to the light intensity of the pixel for the respective pairs of images.

30. The computer-readable storage medium of claim 27, wherein for any particular pixel of the pixels, the apparatus is caused to:

perform a comparison of the light intensity of the reference pixel in one of the images and a light intensity of the particular pixel in an other of the images in which the portion of the scene is the same for the reference pixel in the one of the images and the particular pixel in the other of the images; and identify the particular pixel as a faulty pixel in an instance in which the light intensity of the reference pixel and the light intensity of the particular pixel are different by more than a predetermined threshold that indicates a faulty pixel.

* * * * *